(12) United States Patent
Chakraborty et al.

(10) Patent No.: US 9,079,295 B2
(45) Date of Patent: Jul. 14, 2015

(54) DIAMOND PARTICLE MIXTURE

(75) Inventors: Soma Chakraborty, Houston, TX (US); Gaurav Agrawal, Aurora, CO (US)

(73) Assignee: Baker Hughes Incorporated, Houston, TX (US)

( * ) Notice: Subject to any disclaimer, the term of this patent is extended or adjusted under 35 U.S.C. 154(b) by 541 days.

(21) Appl. No.: 13/084,067

(22) Filed: Apr. 11, 2011

(65) Prior Publication Data

US 2011/0252713 A1 Oct. 20, 2011

Related U.S. Application Data

(63) Continuation of application No. 13/077,426, filed on Mar. 31, 2011.

(60) Provisional application No. 61/324,142, filed on Apr. 14, 2010.

(51) Int. Cl.
| | |
|---|---|
| B24D 3/02 | (2006.01) |
| B24D 3/00 | (2006.01) |
| B24D 11/00 | (2006.01) |
| B24D 18/00 | (2006.01) |
| C09K 3/14 | (2006.01) |
| C09C 1/68 | (2006.01) |
| B24D 99/00 | (2010.01) |
| B01J 3/06 | (2006.01) |
| B82Y 30/00 | (2011.01) |

(52) U.S. Cl.
CPC .............. *B24D 99/005* (2013.01); *B01J 3/062* (2013.01); *B82Y 30/00* (2013.01); *B01J 2203/062* (2013.01); *B01J 2203/0655* (2013.01); *B01J 2203/0685* (2013.01)

(58) Field of Classification Search
USPC ...................... 51/298, 293, 307, 308
See application file for complete search history.

(56) References Cited

U.S. PATENT DOCUMENTS

| | | | |
|---|---|---|---|
| 3,745,623 | A | 7/1973 | Wentorf, Jr. et al. |
| 4,224,380 | A | 9/1980 | Bovenkerk et al. |

(Continued)

FOREIGN PATENT DOCUMENTS

| | | |
|---|---|---|
| WO | 2006032984 A2 | 3/2006 |
| WO | 2008130431 A2 | 10/2008 |
| WO | 2009/048268 A2 | 4/2009 |

OTHER PUBLICATIONS

Cleveland, et al.; "Raman Spectrum of 1-Bromo-Dodecane"; Journal of Chemical Physics; 8; pp. 867-868; (1940).

(Continued)

*Primary Examiner* — James McDonough
(74) *Attorney, Agent, or Firm* — Cantor Colburn LLP

(57) ABSTRACT

A substantially homogeneous particle mixture is disclosed. The mixture includes a plurality of derivatized nanodiamond particles comprising a plurality of first functional groups. The mixture also includes a plurality of microdiamond particles, wherein the derivatized nanodiamond particles and microdiamond particles comprise a substantially homogeneous particle mixture. The mixture may also include a plurality of third particles comprising nanoparticles not identical to the derivatized nanodiamond particles, or a plurality of microparticles not identical to the microdiamond particles, or a combination thereof, and the derivatized nanodiamond particles, derivatized microdiamond particles and third particles comprise the substantially homogeneous particle mixture.

23 Claims, 12 Drawing Sheets

(56) References Cited

U.S. PATENT DOCUMENTS

| | | | |
|---|---|---|---|
| 4,903,164 | A | 2/1990 | Bishop et al. |
| 5,127,923 | A | 7/1992 | Bunting et al. |
| 5,662,183 | A | 9/1997 | Fang |
| 6,045,440 | A | 4/2000 | Johnson et al. |
| 6,220,375 | B1 | 4/2001 | Butcher et al. |
| 6,302,405 | B1 | 10/2001 | Edwards |
| 6,655,234 | B2 | 12/2003 | Scott |
| 6,655,845 | B1 * | 12/2003 | Pope et al. ............... 384/492 |
| 6,951,578 | B1 | 10/2005 | Belnap et al. |
| 7,348,298 | B2 | 3/2008 | Zhang et al. |
| 7,419,941 | B2 | 9/2008 | Waynick |
| 7,449,432 | B2 | 11/2008 | Lockwood et al. |
| 7,516,804 | B2 | 4/2009 | Vail |
| 7,628,234 | B2 * | 12/2009 | Middlemiss ............... 175/434 |
| 7,635,035 | B1 | 12/2009 | Bertagnolli et al. |
| 8,118,896 | B2 | 2/2012 | Can et al. |
| 2005/0136667 | A1 | 6/2005 | Sung |
| 2005/0158549 | A1 * | 7/2005 | Khabashesku et al. ....... 428/403 |
| 2005/0161212 | A1 | 7/2005 | Leismer et al. |
| 2007/0036896 | A1 | 2/2007 | Sung et al. |
| 2008/0127475 | A1 | 6/2008 | Griffo |
| 2008/0209818 | A1 | 9/2008 | Belnap et al. |
| 2009/0158670 | A1 | 6/2009 | Vail |
| 2009/0178345 | A1 | 7/2009 | Russell et al. |
| 2009/0218276 | A1 | 9/2009 | Linford et al. |
| 2010/0041315 | A1 * | 2/2010 | Sung ............................ 451/28 |
| 2010/0187925 | A1 | 7/2010 | Tingler et al. |
| 2011/0088954 | A1 | 4/2011 | DiGiovanni et al. |

OTHER PUBLICATIONS

International Search Report and Written Opinion; International Application No. PCT/US2011/032502; International Filing Date: Apr. 14, 2011; Mailing Date: Dec. 27, 2011; 10 pages.

International Search Report and Written Opinion; International Application No. PCT/US2011/030924; International Filing Date: Apr. 1, 2011; Date of Mailing: Dec. 27, 2011; 9 pages.

Gaurav Saini et al., "Core-Shell Diamond as a Support for Solid-Phase Extraction and High-Performance Liquid Chromatography", Anal. Chem, 2010, vol. 82, No. 11, pp. 4448-4456.

* cited by examiner

DIAMOND PARTICLE MIXTURE

CROSS REFERENCE TO RELATED APPLICATIONS

This application is a Continuation in Part of and claims priority to U.S. patent application Ser. No. 13/077,426 filed on Mar. 31, 2011, and also claims priority to U.S. Provisional Patent Application Ser. No. 61/324,142 filed on Apr. 14, 2010, and contains subject matter related to the subject matter of co-pending patent application Ser. No. 13/084,003 filed on Apr. 11, 2011; all of which are assigned to the same assignee as this application, Baker Hughes Incorporated of Houston, Tex. and incorporated herein by reference in their entirety.

BACKGROUND

Industrial diamonds have been widely and successfully used in a number of downhole applications. They have been used, for example, to provide superabrasive drilling surfaces to afford improved performance of various downhole tools and components, including earth-boring tools for forming boreholes in subterranean earth formations for hydrocarbon production, carbon dioxide sequestration, etc. Diamonds have generally been used to provide cutting elements by securing them to a body. For example, fixed-cutter earth-boring rotary drill bits (also referred to as "drag bits") include diamond cutting elements that are fixed to a bit body of the drill bit. Similarly, roller cone earth-boring rotary drill bits may include various diamond components in cones that are mounted on bearing pins extending from legs of a bit body such that each cone is capable of rotating about the bearing pin on which it is mounted. A plurality of diamond cutting elements may be mounted to each cone of the drill bit.

In particular, polycrystalline diamond compacts (PDCs) formed of small (e.g., micron-sized) diamond grains fused and bonded together by a high temperature, high pressure process using a metal catalyst, and supported on a ceramic substrate, have been used as downhole cutting elements. PDC drill bits have been found to provide a superabrasive abrasive surface which is capable of cutting through hard rock for extended periods of time, and under severe downhole conditions of temperature, pressure, and corrosive downhole environments, while maintaining the integrity and performance of the drill bit.

PDC cutting elements in which the catalyst material remains in the diamond table are generally thermally stable up to a temperature of about 750° C., although internal stress within the cutting element may begin to develop at temperatures exceeding about 400° C. from phase changes in the metal catalyst (e.g., cobalt, which undergoes a transition from the beta-phase to the alpha-phase) and/or differences in the thermal expansion of the diamond grains and the catalyst metal at the grain boundaries. Hence, over time, such PDC drill bits are still subject to cumulative failure modes. In the course of drilling, cutting elements can wear, fracture, or accumulate damage that can alter, limit, or significantly degrade their performance in downhole applications.

Thus, it is desirable to provide diamond compositions that promote improved nucleation and growth of the micron-sized diamond grains used to form the PDC's and that may also be used to reduce the internal stresses associated with the metal catalyst retained in the polycrystalline diamond microstructure, as well as methods of making these diamond compositions. In view of the many desirable properties of diamond, it is also desirable to provide diamond compositions that may be used for other applications, including various fluids, abrasives, coatings and other powder compact applications.

SUMMARY

In an exemplary embodiment, a substantially homogeneous particle mixture is disclosed. The mixture includes a plurality of derivatized nanodiamond particles comprising a plurality of first functional groups. The mixture also includes a plurality of microdiamond particles, wherein the derivatized nanodiamond particles and microdiamond particles comprise a substantially homogeneous particle mixture.

BRIEF DESCRIPTION OF THE DRAWINGS

Referring now to the drawings.

DETAILED DESCRIPTION

Figure 1:
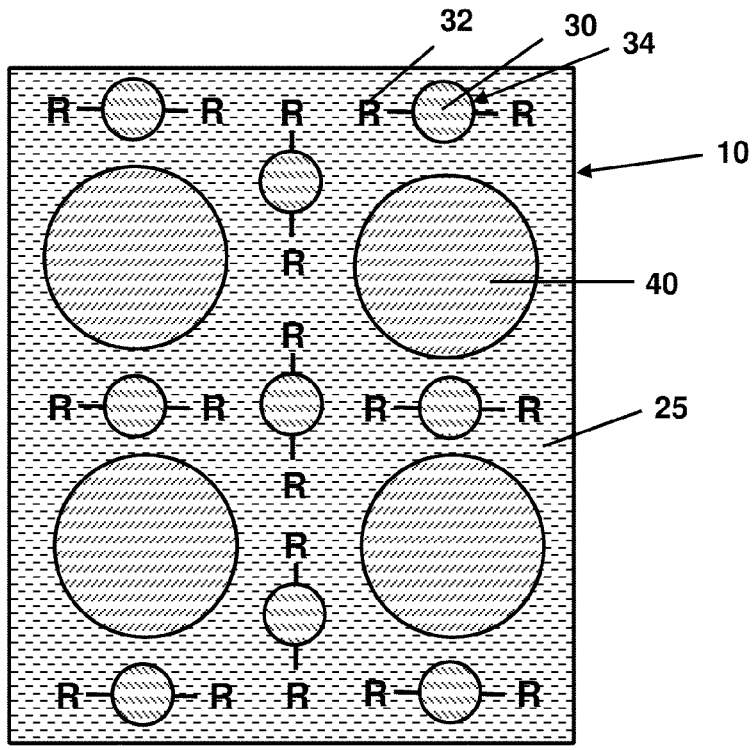
FIG. 1 is a schematic cross-sectional illustration of an exemplary embodiment of a substantially homogeneous suspension of derivatized nanodiamond and microdiamond particles in a solvent.
Figure 2:
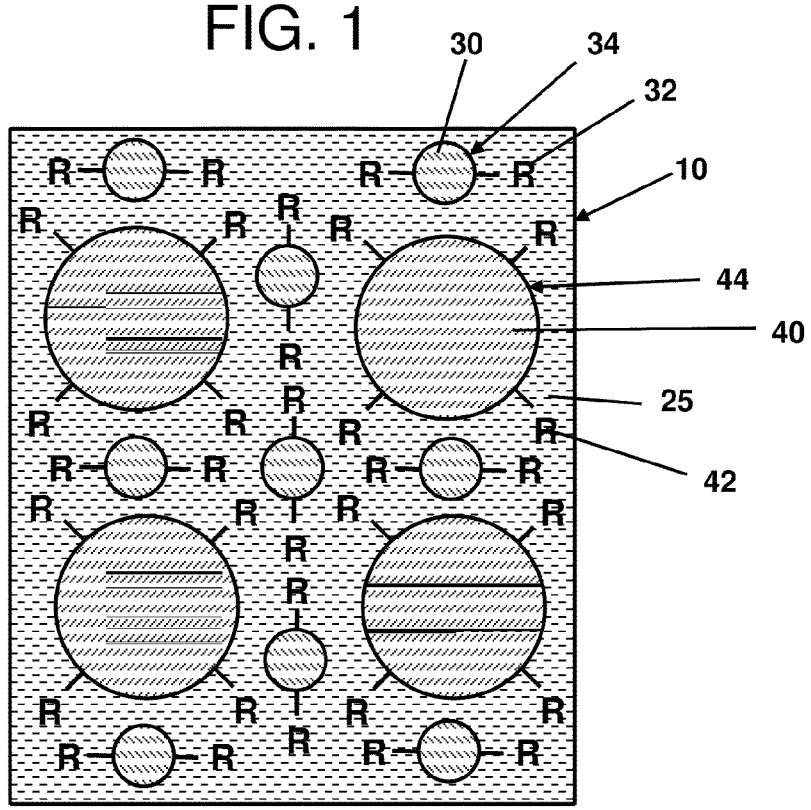
FIG. 2 is a schematic cross-sectional illustration of a second exemplary embodiment of a substantially homogeneous suspension of derivatized nanodiamond and derivatized microdiamond particles in a solvent.

A novel diamond composition comprising a substantially homogeneous admixture 20 of derivatized nanodiamond 34 particles and microdiamond 40 particles and a method of making a substantially homogeneous admixture 20 of these diamond particles from a substantially homogeneous suspension 10 of these particles is disclosed. The substantially homogeneous admixtures 20 of derivatized nanodiamond 30 particles and microdiamond particles 40 may be used in any suitable application and for any suitable purpose, including various abrasives, coatings, lubricants and powder compacts. More particularly, the substantially homogeneous admixture 20 of derivatized nanodiamond 34 particles and microdiamond particles 40 may be used to make a PDC. The substantially homogeneous suspension 10 of derivatized nanodiamond 34 particles and microdiamond particles 40 may be made by a method of forming the suspension 10 using derivatized nanodiamond 34 particles as disclosed herein.

As used herein, the term "substantially homogeneous" with reference to admixtures 20 or suspensions 10 of particles, for example, means that the types of particles being referred to are generally uniformly dispersed within the admixture 20 or suspension 10, without substantial long range agglomeration or separation of the various particle types, but may include some localized agglomeration of particles of the same type or different types as described further herein. For example, various nanodiamond clusters, including those having an average size of about 50-150 nm, and more particularly about 50-100, and more particularly about 75 nm, would represent localized crystallite agglomeration.

As used herein, the term "polycrystalline" means a material (e.g., diamond or diamond composite) comprising a plurality of particles (i.e., crystals) that are bonded directly together by interparticle bonds. The crystal structures of the individual grains of the material may be randomly oriented in space within the polycrystalline material. The grain size of a polycrystalline material may different than the sizes of the constituent particles used to form the material due to nucleation and grain growth that occurs during the compaction and sintering of the particles, for example.

References herein to a "nanodiamond" or "microdiamond" should be understood as a reference to a nanodiamond 30 particle or microdiamond 40 particle. References herein in the singular tense to a particular particle type, such as a nanodiamond 30, microdiamond 40, or third particle 50, including nanoparticle 56 or microparticle 58 type particle, may also be extended to a plurality of that type of particle, unless the context requires otherwise. While it is sometimes useful to describe aspects of a particular particle type in the singular tense, one of ordinary skill in the art will understand that in making mixtures 20 and suspensions 10 of the various particle types disclosed herein that it is generally useful to employ a plurality of the various particle types associated with the particular admixture 20 or suspension 10 described.

It has been found that derivatizing a nanodiamond 30 to include a functional group or a plurality of groups and suspending in a solvent 25 and/or water the derivatized nanodiamond 34 with other components or constituents of the polycrystalline diamond such as a larger diamond particle (e.g., a microdiamond) or a third particle 50, such as another nanoparticle 56 or microparticle 58, and a metal for catalyzing carbon-carbon bonding during diamond formation, affords a precursor suspension when combined with a solvent 25 in which the components are substantially uniformly or homogeneously distributed. The derivatized nanodiamond 34 has a greater affinity to its environment while suspended and remains suspended longer than a non-derivatized nanodiamond, or one which has been co-suspended with a dispersant, and more particularly may remain suspended substantially longer than a non-derivatized nanodiamond, and even more particularly may comprise a colloidal suspension 10 or a substantially non-settling suspension 10. The derivatized nanodiamond 34 particles may form a substantially homogeneous suspension 10 that is substantially non-settling for a predetermined shelf or service life without requiring subsequent mixing, stirring or other methods of promoting the suspension 10.

It has been found that in addition to derivatizing the nanodiamond 30, derivatizing the other components or constituents of the polycrystalline diamond such as the larger diamond particle (e.g., a microdiamond) or a third particle 50, such as another nanoparticle 56 or microparticle 58, and a metal for catalyzing carbon-carbon bonding during diamond formation, affords a precursor suspension when combined with a solvent 25 in which the components are substantially uniformly or homogeneously distributed. The derivatized particles, including nanodiamond 30 and microdiamond 40 or third particles 50, or any combination thereof, have a greater affinity to their environment while suspended and remains suspended longer than non-derivatized particles, and more particularly may remain suspended substantially longer than non-derivatized particles, and even more particularly may comprise a colloidal suspension 10 or a substantially non-settling suspension 10. The derivatized particles may form a substantially homogeneous suspension 10 that is substantially non-settling for a predetermined shelf or service life without requiring subsequent mixing, stirring or other methods of promoting the suspension 10.

Referring to the Figures, and more particularly FIG. 1-13, an exemplary embodiment of a method 200 of forming various substantially homogeneous suspensions 10 of derivatized nanodiamond 34 particles and microdiamond 40 particles is disclosed, as well as exemplary embodiments of the substantially homogeneous particle mixtures that may be formed from these suspensions.

Figure 13:
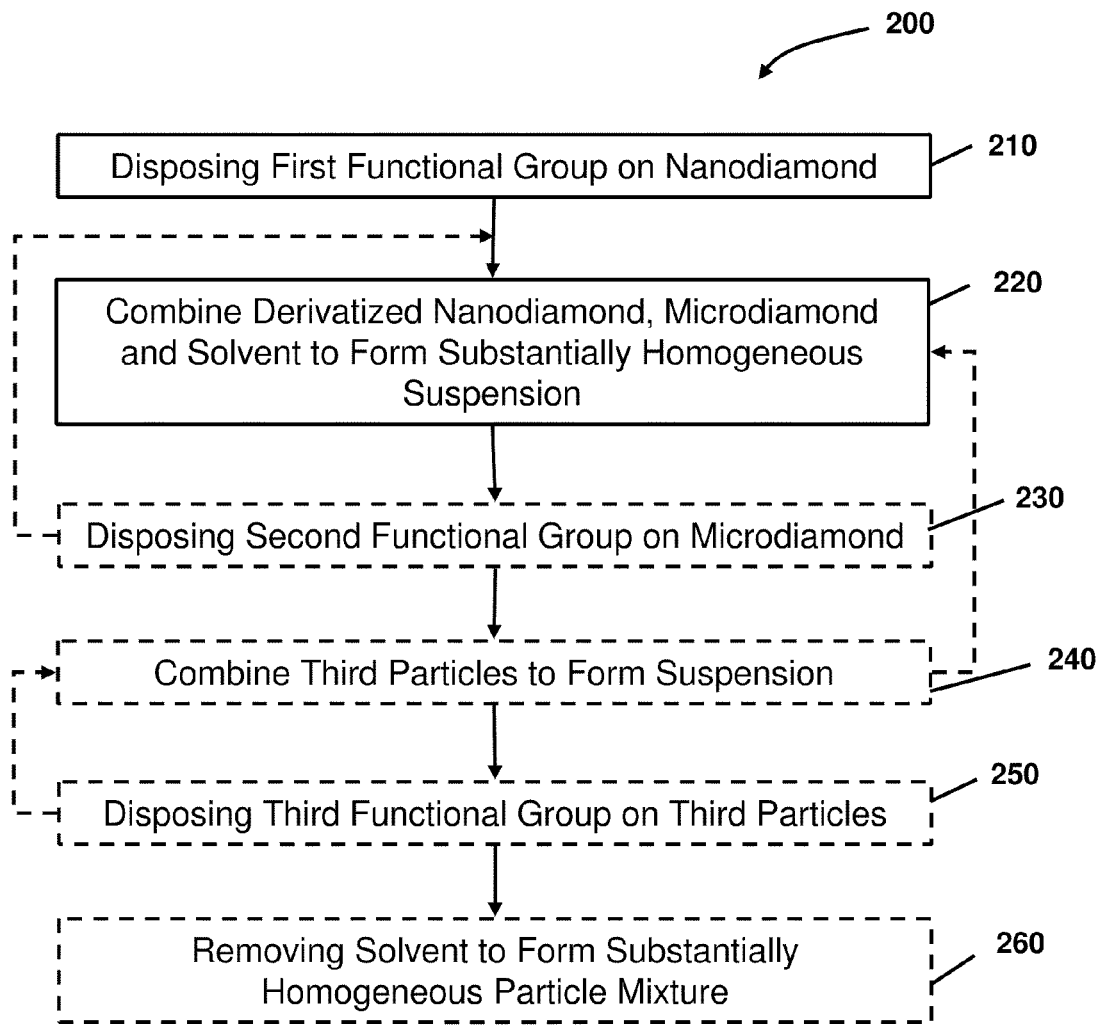
FIG. 13 is an exemplary embodiment of a method of making a substantially homogeneous suspension of derivatized nanodiamond and microdiamond as disclosed herein.

In one embodiment, as illustrated in FIG. 13, the method 200 includes disposing 210 a first functional group 32 on a plurality of nanodiamond 30 particles to form derivatized nanodiamond 34 particles as described herein. The method 200 also includes combining 220 the derivatized nanodiamond 34 particles with a plurality of microdiamond 40 particles and a solvent 25 to form a substantially homogeneous suspension 10 of the derivatized nanodiamond 34 particles and microdiamond 40 particles in the solvent 25 as described herein and illustrated in FIG. 1.

In another embodiment, the method 200 may also optionally include disposing 230 a second functional group 42 on the plurality of microdiamond 40 particles to form derivatized microdiamond 44 particles. This may be done in any suitable manner or step of the method, either separately from or in conjunction with disposing 210 a first functional group 32 on a plurality of nanodiamond 30 particles to form the derivatized nanodiamond 34 particles. Disposing 230 the second functional group 42 on the plurality of microdiamond 40 particles to form derivatized microdiamond 44 particles may be done prior to, during or after combining the derivatized nanodiamond 34 particles and microparticles 58. In one embodiment, disposing 230 the second functional group 42 on the plurality of microdiamond 40 particles to form derivatized microdiamond 44 particles is done prior to combining 220 the nanodiamond 30 particles and microdiamond 40 particles.

Disposing 210 a first functional group 32 on a plurality of nanodiamond 30 particles to form derivatized nanodiamond 34 particles may be performed by any suitable method of forming the chemical bond between the first functional group 32 and the nanodiamond 30, including those disclosed herein. The first functional group 32 may include any suitable organic functional group or groups as well as any suitable inorganic compounds, and may include at least one of an alkyl, alkenyl, alkynyl, carboxyl, hydroxyl, amino, amido, epoxy, keto, alkoxy, ether, ester or lactone functional group, or a combination thereof; a metal; an organometallic material; an oligomer or a polymer; or an ionic group; or a combination thereof. Since disposing 210 to form the derivatized nanodiamond 34 may involve forming a suspension 10 or slurry of nanodiamond 30 in a solvent or reactant liquid, in one embodiment combining 220 may involve use of the suspension 10 or slurry of the derivatized nanodiamond 34 particles in the solvent or reactant liquid. Alternately, the solvent or reactant liquid may be removed to provide just derivatized nanodiamond 34 prior to combining 220 and solvent 25 may be different than a solvent used to derivatize nanodiamond 30.

Combining 220 the derivatized nanodiamond 34 particles with a plurality of microdiamond 40 particles and a solvent 25 to form a substantially homogeneous suspension 10 of the derivatized nanodiamond 34 particles and microdiamond 40 particles in the solvent 25 may be performed by any suitable method of combining these materials, including various mixing methods, including slurry mixing methods, as described herein.

When employed, disposing 230 a second functional group 42 on the plurality of microdiamond 40 particles to form derivatized microdiamond 44 particles may be performed by any suitable method of forming the chemical bond between the second functional group 42 and the microdiamond 40, including those disclosed herein. The second functional group 42 may include any suitable organic functional group or groups as well as any suitable inorganic compounds, and may include at least one of an alkyl, alkenyl, alkynyl, carboxyl, hydroxyl, amino, amido, epoxy, keto, alkoxy, ether, ester or lactone functional group, or a combination thereof; a metal; an organometallic material; an oligomer or a polymer; or an ionic group; or a combination thereof. Thus, the first functional group 32 or the second functional group 42, or both of them, may include the functional groups listed above in any combination. Since disposing 230 to form the derivatized microdiamond 44 may involve forming a suspension 10 or slurry of microdiamond 40 in a solvent or reactant liquid, in one embodiment combining 220 may involve use of the suspension 10 or slurry of the derivatized microdiamond 44 particles in the solvent or reactant liquid. Alternately, the solvent or reactant liquid may be removed to provide just derivatized microdiamond 44 prior to combining 220 and solvent 25 may be different than a solvent used to derivatize microdiamond 40.

Figure 3:
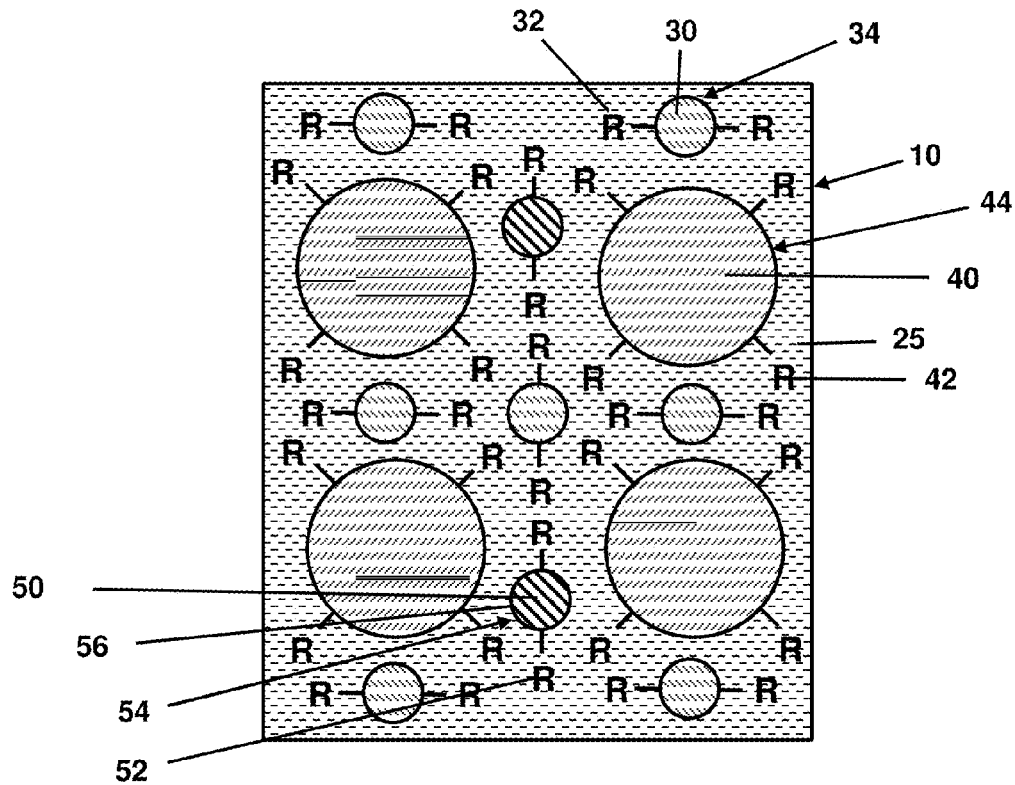
FIG. 3 is a schematic cross-sectional illustration of a third exemplary embodiment of a substantially homogeneous suspension of derivatized nanodiamond, derivatized microdiamond and derivatized third particles, including derivatized nanoparticles in a solvent.
Figure 4:
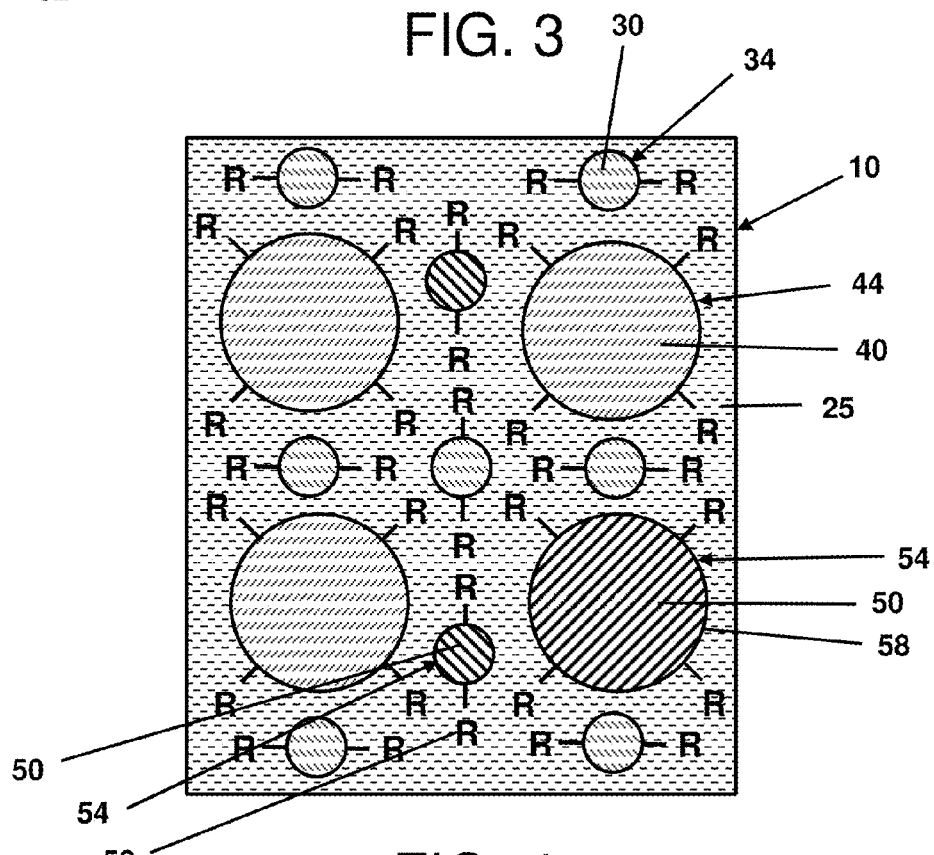
FIG. 4 is a schematic cross-sectional illustration of a fourth exemplary embodiment of a substantially homogeneous suspension of derivatized nanodiamond, derivatized microdiamond and derivatized third particles, including derivatized nanoparticles and derivatized microparticles, in a solvent.
Figure 5:
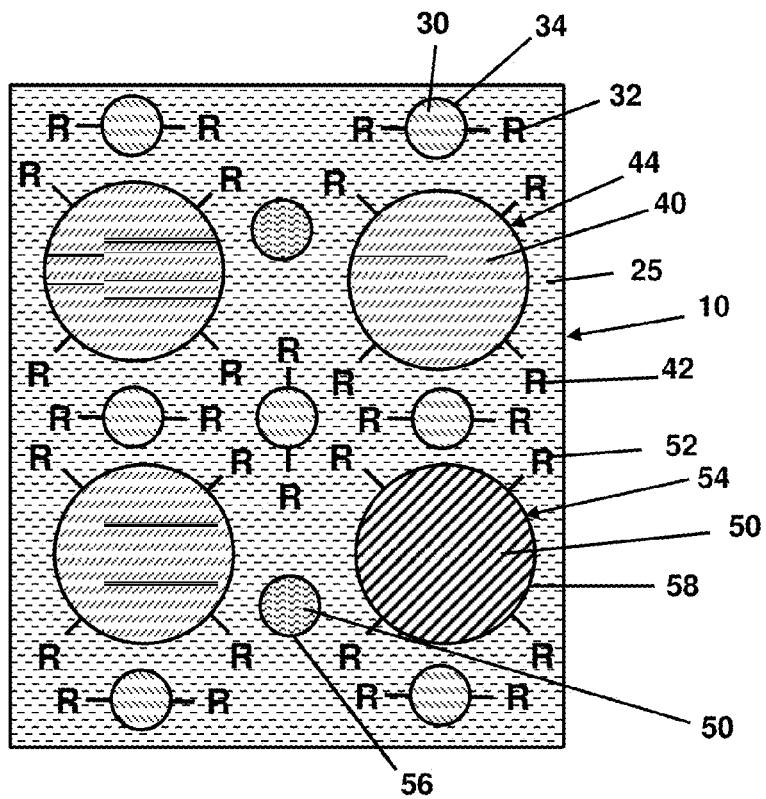
FIG. 5 is a schematic cross-sectional illustration of a fifth exemplary embodiment of a substantially homogeneous suspension of derivatized nanodiamond, derivatized microdiamond and derivatized and underivatized third particles, including underivatized nanoparticles and derivatized microparticles, in a solvent.

The method 200 may also include combining 240 a plurality of third particles 50 comprising nanoparticles 56 not identical to the derivatized nanodiamond 34 particles, or a plurality of microparticles 58 not identical to the microdiamond 40 particles, or a combination thereof, as disclosed herein, to the derivatized nanodiamond 34 particles, microdiamond 40 particles and solvent 25 to form a substantially homogeneous suspension 10 of the derivatized nanodiamond 34 particles, microdiamond 40 particles and third particles 50 in the solvent 25 as illustrated in FIGS. 3-5. Any suitable third particles 50 may be combined, including various nanoparticles 56 and microparticles 58, or a combination thereof. A suitable nanoparticle 56 includes a fullerene, nanographite, nanographene, graphene oxide, nanotube, adamantane, diamondoid, nanodiamond, polysilsesquioxane, nanoclay, metal, metallic carbide, metallic nitride or a metallic carbonate or metallic bicarbonate nanoparticle 56, or a combination thereof. Still further, a suitable nanoparticle 56 may include a single-walled carbon nanotube, multi-walled carbon nanotube, nanographene, nanodiamond, boron nitride, boron carbide or silicon carbide nanoparticle 56, or a combination thereof. A suitable microparticle 58 includes a graphite, carbon fiber, boron nitride, diamond, silicon carbide or tungsten carbide microparticle 58, or a combination thereof.

The method 200 may also optionally include disposing 250 a third functional group 52 on the plurality of third particles 50 to form derivatized third particles 54 prior to combining them with the derivatized nanodiamond 34 particles and microdiamond 40 particles. The third functional group 52 may include any suitable organic functional group or groups as well as any suitable inorganic compounds, and may include at least one of an alkyl, alkenyl, alkynyl, carboxyl, hydroxyl, amino, amido, epoxy, keto, alkoxy, ether, ester or lactone functional group, or a combination thereof; a metal; an organometallic material; an oligomer or a polymer; or an ionic group; or a combination thereof. Thus, the first functional group 32, second functional group 42 or third functional group 52, or any combination thereof, may include the listed functional groups in any combination. Since disposing 250 to form the derivatized nanodiamond 34 may involve forming a suspension 10 or slurry of nanodiamond 30 in a solvent or reactant liquid, in one embodiment combining 220 may involve use of the suspension 10 or slurry of the derivatized third particles 54 in the solvent or reactant liquid. Alternately, the solvent or reactant liquid may be removed to provide just derivatized third particles 54 prior to combining 220 and solvent 25 may be different than a solvent used to derivatize third particles 50. The derivatized third particles 54 may be combined 220 with either derivatized microdiamond 44 or underivatized microdiamond 40, as illustrated in FIGS. 3-5.

The method 200 may also include removing 260 the solvent 25 from the substantially homogeneous suspension 10 to form a substantially homogenous mixture 20 of derivatized nanodiamond 34 particles and microdiamond 40 particles, which may be either derivatized or underivatized as described herein. In embodiments that include third particles 50, the third particles 50 may be either derivatized or underivatized as described herein.

Figure 6:
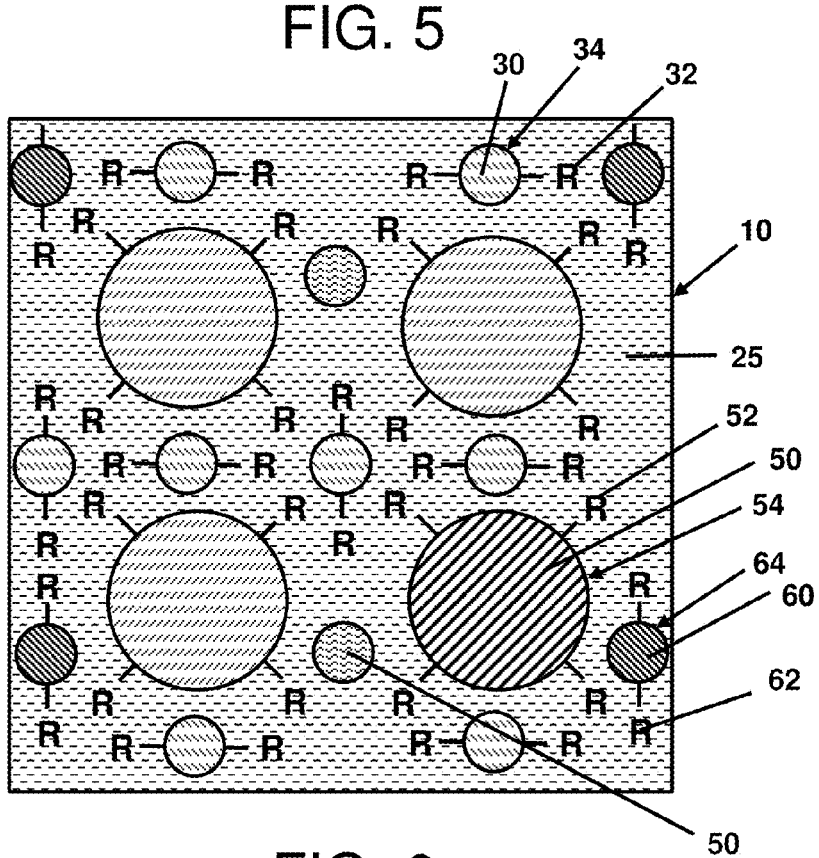
FIG. 6 is a schematic cross-sectional illustration of a sixth exemplary embodiment of a substantially homogeneous suspension of derivatized nanodiamond, derivatized microdiamond, derivatized and underivatized third particles, including underivatized nanoparticles and derivatized microparticles, and catalyst-solvent particles in a solvent.
Figure 7:
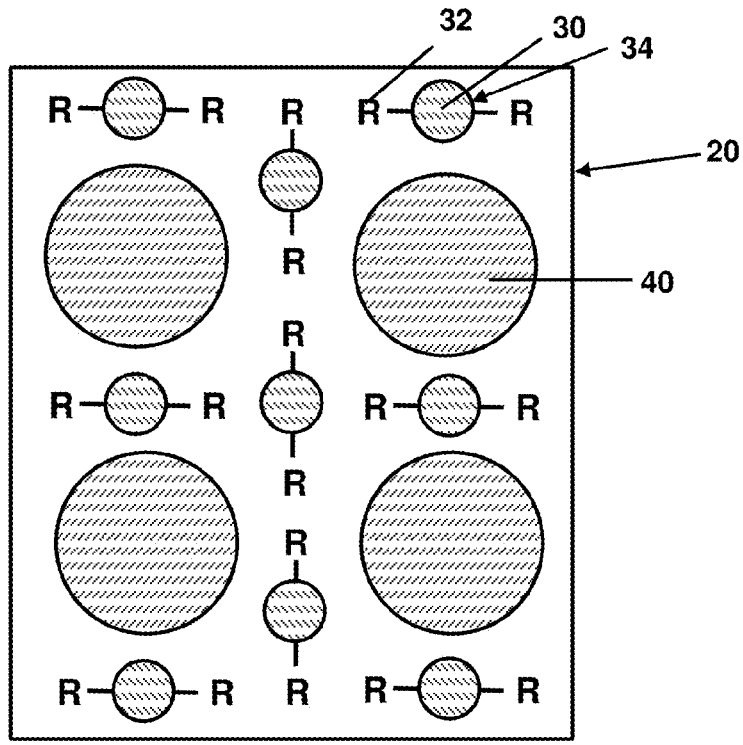
FIG. 7 is an exemplary embodiment of a substantially homogeneous particle mixture formed by removing the solvent from the suspension of FIG. 1.

In an exemplary embodiment, the method 200 may include combining 220 that includes mixing the derivatized nanodiamond 34 particles, derivatized microdiamond 44 particles, and metal solvent-catalyst particles 60 to form a substantially homogeneous suspension 10 of the derivatized nanodiamond 34 particles, derivatized microdiamond 44 particles and metal solvent-catalyst 60 particles as described herein, forming a polycrystalline diamond precursor by removing the solvent 25, and reacting the polycrystalline diamond precursor under conditions of heating and pressure. In another exemplary embodiment, the method 200 may include mixing that further comprises adding a plurality of third particles 50 comprising nanoparticles 56 not identical to the derivatized nanodiamond 34 particles, or a plurality of microparticles 58 not identical to the derivatized microdiamond 44 particles, or a combination thereof, to the derivatized nanodiamond 34 particles, derivatized microdiamond 44 particles and metal solvent-catalyst 60 particles to form a substantially homogeneous suspension 10, as illustrated in FIG. 6. In yet another exemplary embodiment, mixing may include slurrying or forming a slurry of the derivatized nanodiamond 34 particles, derivatized microdiamond 44 particles, and metal solvent-catalyst 60 particles to in a solvent 25 to form a suspension 10 having greater homogeneity than a suspension 10 in which a non-derivatized nanodiamond 34 and non-derivatized microdiamond 44 are included in place of the derivatized nanodiamond 34 and derivatized microdiamond 44. Slurrying may also include the addition of a binder to aid in binding the particle mixture 20 together or forming articles or precursor articles of the particle mixture 20 together as described herein.

In one embodiment, reacting includes heating the polycrystalline diamond precursor at a temperature of greater than or equal to about 1,000° C. at a pressure that is greater than or equal to about 5 gigapascals (GPa) for about 1 second to about 1 hoursuspension 10 followed by catalyst removal. The resulting polycrystalline diamond has a highly uniform structure which has increased resistance to wear and degradation resulting from use in e.g., a drilling application. Such a polycrystalline diamond, and a PDC and cutting tool (e.g., a drill bit) prepared from the polycrystalline diamond, has a longer effective useful life than a similarly prepared polycrystalline diamond prepared without a derivatized nanodiamond 30.

The polycrystalline diamond, prepared by the method herein, includes a nanodiamond 30 that has been derivatized, a microdiamond 40 that may be either derivatized or underivatized as described herein, and a metal solvent-catalyst. Additional components, such as third particles 50, including nanoparticles 56 not identical to the derivatized nanodiamonds 30, and microparticles 58 not identical to the microdiamonds 40, that may be either derivatized or underivatized as described herein, may also be included.

Upon removing 260 the solvent 25 from the substantially homogeneous suspension 10, a substantially homogeneous particle mixture 20 is formed. In an exemplary embodiment the particle mixture 20 includes a plurality of derivatized nanodiamond 34 particles comprising a plurality of first functional groups 32 and a plurality of underivatized microdiamond 40 particles, as described herein and illustrated in FIG. 7. In an exemplary embodiment, each of the derivatized nanodiamond 34 particles includes at least one of the first functional groups 32, and in other embodiments may include a plurality of first functional groups 32. Optionally, an alternative of this embodiment comprises a substantially homogeneous mixture 20 that also includes a plurality of particles of a metal solvent-catalyst 60, which may be either derivatized or underivatized. If derivatized, the plurality of metal solvent-catalyst 60 particles may have the same functional group or a different functional group than the other derivatized particles of the mixture 20.

Figure 8:
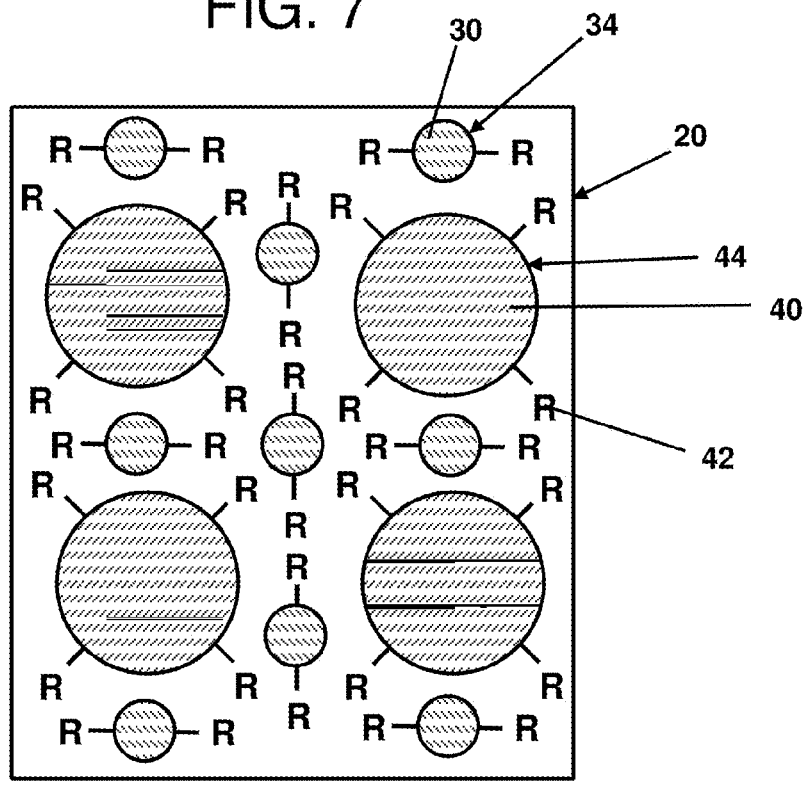
FIG. 8 is a second exemplary embodiment of a substantially homogeneous particle mixture formed by removing the solvent from the suspension of FIG. 2.

In another exemplary embodiment, the particle mixture 20 includes a substantially homogeneous particle mixture 20 that includes a plurality of derivatized nanodiamond 34 particles comprising a plurality of first functional groups 32 and a plurality of derivatized microdiamond 44 particles comprising a plurality of second functional groups 42, as described herein and illustrated in FIG. 8. In an exemplary embodiment, each of the derivatized nanodiamond 34 particles includes at least one of the first functional groups 32, and in other embodiments may include a plurality of first functional groups 32. In an exemplary embodiment, each of the derivatized microdiamond 44 particles includes at least one of the second functional groups 42, and in other embodiments may include a plurality of second functional groups 42. In an exemplary embodiment, the first functional group 32 and the second functional group 42 may be the same functional group. In another exemplary embodiment, the first functional group 32 and the second functional group 42 may be different functional groups. Optionally, an alternative of this embodiment comprises a substantially homogeneous mixture 20 that also includes a plurality of particles of a metal solvent-catalyst 60, which may be either derivatized metal solvent-catalyst 64 particles (FIG. 12) or underivatized metal solvent-catalyst 60 particles. If derivatized, the plurality of derivatized metal solvent-catalyst particles 64 may have the same functional group or a different functional group than the other derivatized particles of the mixture 20.

Figure 9:
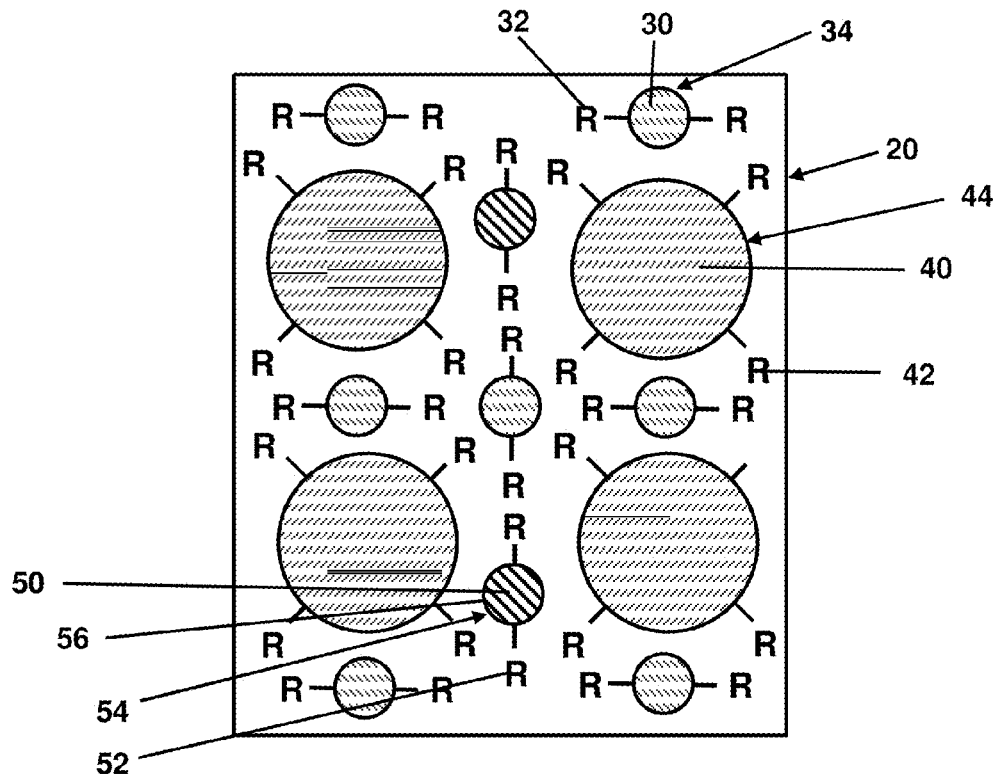
FIG. 9 is a third exemplary embodiment of a substantially homogeneous particle mixture formed by removing the solvent from the suspension of FIG. 3.
Figure 10:
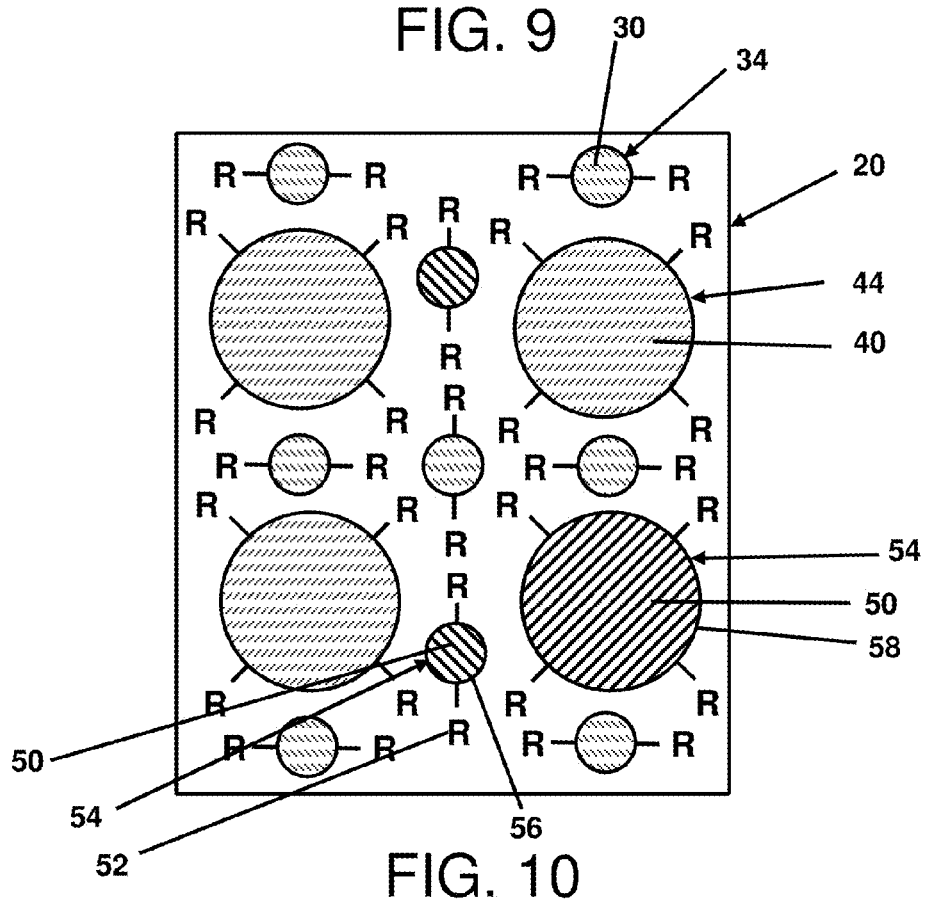
FIG. 10 is a fourth exemplary embodiment of a substantially homogeneous particle mixture formed by removing the solvent from the suspension of FIG. 4.
Figure 11:
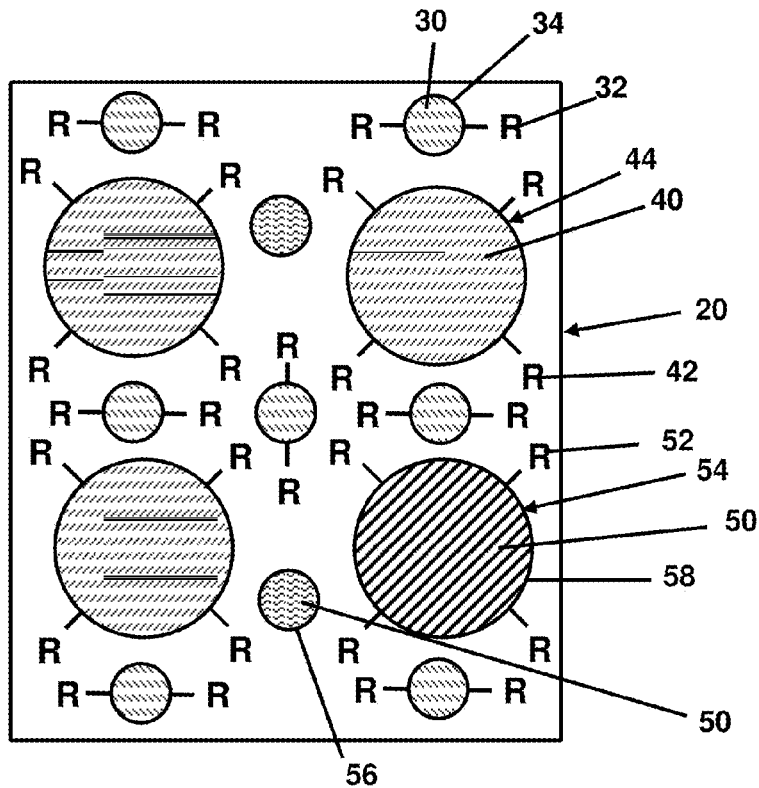
FIG. 11 is a fifth exemplary embodiment of a substantially homogeneous particle mixture formed by removing the solvent from the suspension of FIG. 5.
Figure 12:
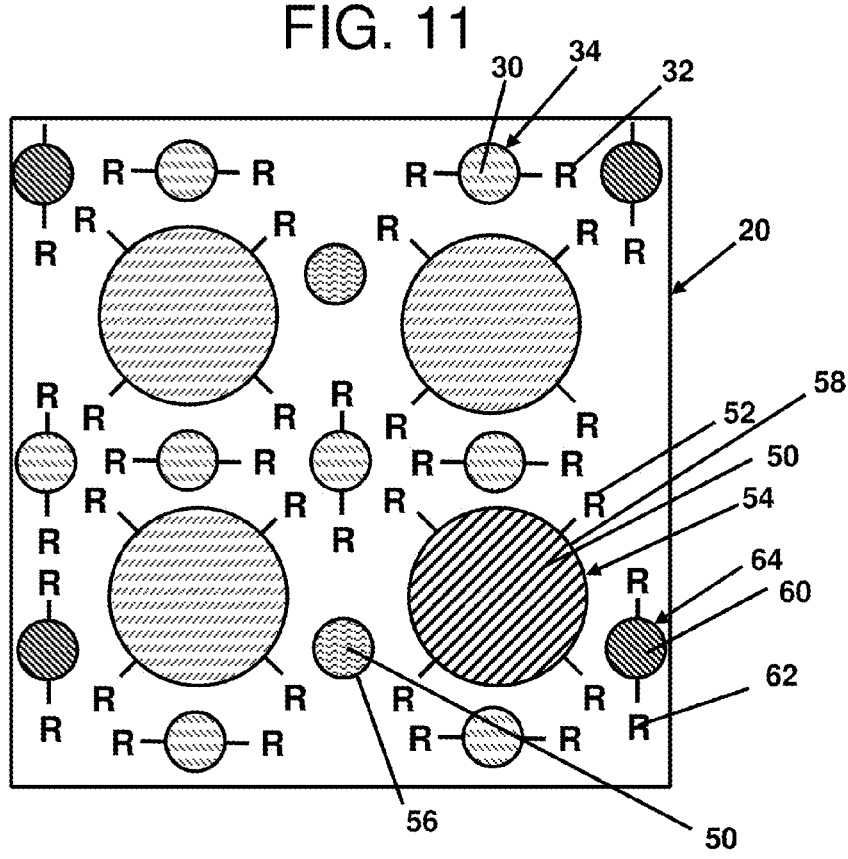
FIG. 12 is a sixth exemplary embodiment of a substantially homogeneous particle mixture formed by removing the solvent from the suspension of FIG. 6.

In yet another exemplary embodiment, the particle mixture 20 includes a substantially homogeneous particle mixture 20 that includes a plurality of derivatized nanodiamond 34 particles comprising a plurality of first functional groups 32, a plurality of derivatized microdiamond 44 particles comprising a plurality of second functional groups 42 and a plurality of derivatized third particles 54 comprising nanoparticles 56 not identical to the derivatized nanodiamond 34 particles, or a plurality of microparticles 58 not identical to the microdiamond 40 particles, or a combination thereof, as described herein and illustrated in FIGS. 9-11. Each of the derivatized nanodiamond 34 particles includes at least one of the first functional groups 32, and in other embodiments may include a plurality of first functional groups 32. Each of the derivatized microdiamond 44 particles includes at least one of the second functional groups 42, and in other embodiments may include a plurality of second functional groups 42. Each of the derivatized third particles 54 includes at least one of the third functional groups 52, and in other embodiments may include a plurality of third functional groups 52. In an exemplary embodiment, the first functional group 32, second functional group 42 and third functional group 52 may be the same functional group. In another exemplary embodiment, the first functional group 32, second functional group 42 and third functional group 52 may be different functional groups. Optionally, alternates of this embodiment include substantially homogeneous mixtures where either or both of microparticles and third particle 50 are underivatized. Optionally, alternatives of these embodiments comprise substantially homogeneous mixtures 20 that also include a plurality of particles of a metal solvent-catalyst 60, which may be either derivatized metal solvent-catalyst 64 particles (FIG. 12) or underivatized metal solvent-catalyst 60 particles. If derivatized, the plurality of derivatized metal solvent-catalyst 64 particles may have the same functional group or a different functional group than the other derivatized particles of the mixture 20.

Nanodiamonds 30 are diamond particles having an average particle size of less than one micrometer (μm). As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source or zeta potential using a Zetasizer made by Malvern Instruments. Nanodiamonds 30 as disclosed herein include generally diamond particles having an average particle size of 1 nanometer (nm) to less than 1 micrometer (μm), and include both diamond particles having an average particle size of 250 nm or less (sometimes referred to in the art as "nanodiamonds"), and diamond particles having an average particle size of greater than 250 nm to less than 1 μm (sometimes referred to in the art as "sub-micron sized" diamond particles). In an embodiment, a nanodiamond 30 may have an average particle size of about 0.01 to about 500 nm, specifically 0.1 to 250 nm, more specifically about 1 to about 150 nm, more specifically about 10 to about 125 nm, and still more specifically about 25 to about 100 nm. The nanodiamonds 30 may be monodisperse, where all particles are of the same size with little variation, or polydisperse, where the particles have a range of sizes and are averaged. Generally, polydisperse nanodiamonds 30 are used. Nanodiamonds 30 of different average particle size may be used, and in this way, the particle size distribution of the nanodiamonds 30 may be unimodal (exhibiting a single distribution), bimodal exhibiting two distributions, or multimodal, exhibiting more than one particle size distribution, where there is a gradient in particle size.

The minimum particle size for the smallest 5 percent of the nanodiamonds 30 may be less than 0.1 nm, specifically less than or equal to 0.05 nm, and more specifically less than or equal to 0.01 nm. Similarly, the maximum particle size for 95% of the nanodiamonds 30 is greater than or equal to 900 nm, specifically greater than or equal to 750 nm, and more specifically greater than or equal to 500 nm.

The nanodiamonds 30 used herein may be from a naturally occurring source, such as a by-product of milling or other processing of natural diamonds, or may be synthetic, prepared by any suitable commercial method such as, but not limited to, high-pressure high-temperature (HPHT), explosive shock (also referred to as detonation, abbreviated DTD), chemical vapor deposition (CVD), physical vapor deposition (PVD), ultrasonic cavitation, and the like. Nanodiamonds 30 may be used as received, or may be sorted and cleaned by various methods to remove contaminants and non-diamond carbon phases that may be present, such as residues of amorphous carbon or graphite.

The nanodiamonds 30 used herein are derivatized to introduce functional groups to the nanodiamond. The derivatized nanodiamond includes functional groups comprising alkyl, alkenyl, alkynyl, carboxyl, hydroxyl, amino, amido, epoxy, keto, alkoxy, ether, ester, lactones, metallic groups, organometallic groups, polymeric groups, ionic groups or a combination comprising at least one of the foregoing. Alternatively, or in addition, the microdiamond may be derivatized with the foregoing functional groups.

In an embodiment, nanodiamond can be derivatized by oxidative methods to produce carboxylic acid functional groups which carry a negative charge. In another embodiment, the nanodiamond can be further derivatized by grafting certain polymer chains which may be neutral in charge, or which can carry either a negative or positive charge by adjusting the pH value of its aqueous solution. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly (ethylene glycol) and poly(propylene glycol), may be included by derivatization of the nanodiamond.

Figure 14:
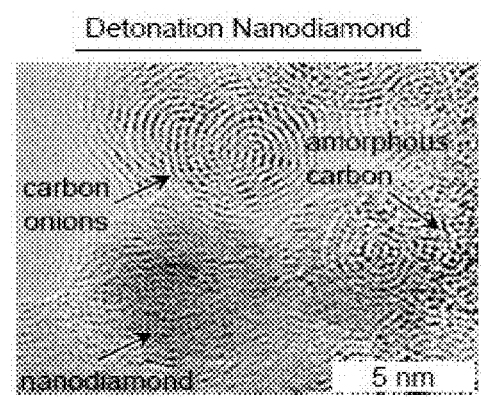
FIG. 14 is a transmission electron microscopy (TEM) image of an exemplary nanodiamond showing a nanodiamond core, carbon onions, and amorphous carbon region.

It will be appreciated that the nanodiamond being functionalized includes, in addition to a diamond lattice core, a shell or surrounding region of a graphitic compositions including amorphous carbon and an ordered graphitic region sometimes referred to as a "carbon onion." FIG. 14 is a transmission electron microscopy (TEM) image of an exemplary nanodiamond showing a nanodiamond core, carbon onions, and amorphous carbon region. The carbon onion may surround the diamond lattice core and may be attached to the core by covalent bonds or by a dispersion mechanism. The amorphous carbon region and especially the carbon onion region of the nanodiamond are believed to include sites of unsaturation (e.g., double bonds) which react under conditions of functionalization to form functional groups.

Introduction of functional groups by derivatizing the unsaturated functionality associated with the amorphous and carbon onion regions of a nanodiamond may be effected by any of numerous known methods for direct carbon-carbon bond formation to a double bond, or by linking to a functional group derived from an olefin. Exemplary methods of functionalizing may include, but are not limited to, reactions such as oxidation or oxidative cleavage of double bonds to form alcohols, diols, or carbonyl groups including aldehydes, ketones, or carboxylic acids; diazotization of double bonds proceeding by the Sandmeyer reaction; intercalation/metallization of the nanodiamond by treatment with a reactive metal such as an alkali metal including lithium, sodium, potassium, and the like, to form an anionic intermediate, followed by treatment with a molecule capable of reacting with the metalized nanodiamond such as a carbonyl-containing species (carbon dioxide, carboxylic acids, anhydrides, esters, amides, imides, etc.), an alkyl species having a leaving group such as a halide (Cl, Br, I), a tosylate, a mesylate, or other reactive esters such as alkyl halides, alkyl tosylates, etc.; molecules having benzylic functional groups; use of transmetalated species with boron, zinc, or tin groups which react with e.g., aromatic halides in the presence of catalysts such as palladium, copper, or nickel, which proceed via mechanisms such as that of a Suzuki coupling reaction or the Stille reaction; pericyclic reactions (e.g., 3 or 4+2) or thermocyclic (2+2) cycloadditions of other olefins, dienes, heteroatom substituted olefins, or the like.

In other embodiments, the nanodiamond may be treated to remove the outermost carbon onion prior to derivatizing. Where a treated nanodiamond is derivatized, initial derivatization to include a functional group may be accomplished by, for example, direct halogenations using a method of halogenation such as free-radical halogenation to include e.g., bromine atoms, followed by hydrolysis to the alcohol, or direct metallization, and further functionalized by for example ether synthesis or alkylation; introduction of oxygen functional groups such as alcohols or ketones by, for example, nitration followed by hydrolysis; or the like.

It will be appreciated that the above methods are intended to illustrate the concept of introducing functional groups to a nanodiamond, and should not be considered as limiting to such methods.

The polycrystalline diamond further comprises a microdiamond 40. Microdiamonds 40 are diamond particles having an average particle size of greater than or equal to 1 micrometer (μm). In an embodiment, the average particle size of the microdiamond is about 1 μm to about 250 μm, specifically about 2 μm to about 200 μm, and more specifically about 1 μm to about 150 μm.

As with the nanodiamonds 30 above, the microdiamonds 40 may be monodisperse, where all particles are of the same size with little variation, or polydisperse, where the particles have a range of sizes and are averaged. Generally, polydisperse microdiamonds 40 are used. Microdiamonds 40 of different average particle size, monodisperse or polydisperse, or both, may be used, and the particle size distribution of the microdiamonds 40 may be unimodal, bimodal, or multimodal. Microdiamonds 40, as with the nanodiamonds 30, may be used as received, or may be sorted and cleaned by various methods to remove contaminants and non-diamond carbon phases that may be present, such as residues of amorphous carbon or graphite.

The minimum particle size for the smallest 5 percent of the microdiamonds 40 may be less than 0.1 μm, specifically less than or equal to 0.05 μm, and more specifically less than or equal to 0.01 μm. Similarly, the maximum particle size for 95% of the microdiamond is greater than or equal to 1,000 μm, specifically greater than or equal to 750 μm, and more specifically greater than or equal to 500 μm.

It will be understood that the average particle sizes of the derivatized nanodiamond is less than that of the microdiamond. In an embodiment, the average particle size of the microdiamond is at least about 10 times greater, specifically about 25 times greater, more specifically about 50 times greater, and still more specifically about 100 times greater than the average particle size of the derivatized nanodiamond. In another embodiment, the average particle size of the derivatized nanodiamond is about 150 times greater, and specifically about 250 to about 750 times greater, than the average particle size of the derivatized nanodiamond.

The polycrystalline diamond comprises 0.001 to 90 wt % of derivatized nanodiamond based on the total weight of the derivatized nanodiamond 34, microdiamond 40, and metal solvent-catalyst 60. In a specific embodiment, the polycrystalline diamond comprises 0.01 to 70 wt %, and more specifically 0.1 to 50 wt % of derivatized nanodiamond based on the total weight of the derivatized nanodiamond 34, microdiamond 40, and metal solvent-catalyst 60. In an exemplary embodiment, the derivatized nanodiamond 34 may be present in an amount of more specifically 0.1 to 10 wt %, based on the total weight of the derivatized nanodiamond 34, microdiamond 40, and metal solvent-catalyst 60.

In an embodiment, the polycrystalline diamond may further include a nanoparticle 56 not identical to the derivatized nanodiamond 34, a microparticle 58 not identical to the microdiamond 40, or a combination comprising at least one of the foregoing. In a further embodiment, the nanoparticle and/or microparticle may optionally be derivatized to have the aforementioned functional groups.

As used herein, the term "nanoparticle" 56 means and includes any particle having an average particle size of about 1 μm or less. Nanoparticles 56 may include, for example fullerenes, nanographite, nanographene, graphene oxide, nanotubes, nanodiamonds including nano-sized and sub-micron sized diamond particles, diamondoids, polysilsesquioxanes, nanoclays, an inorganic nanoparticle 56 including a metal or metalloid carbide, a metal or metalloid nitride, a metal carbonate, a metal bicarbonate, a metal oxide (ceramic), a metal nanoparticle 56, or combinations comprising at least one of the foregoing.

In an embodiment, nanoparticles 56 used herein may have an average particle size of about 0.01 to about 500 nm, specifically 0.1 to 250 nm, and more specifically about 1 to about 150 nm. While it will be understood that the nanoparticles 56, including the nanodiamonds 30 disclosed hereinabove, may be spherical, symmetrical, irregular, or elongated in shape and may have a low aspect ratio (i.e., largest dimension to smallest dimension) of less than 10 and approaching 1 in a spherical particle, in other embodiments the nanoparticle 56 may have a two-dimensional aspect ratio (i.e., diameter to thickness for elongated nanoparticles 56 such as nanotubes or diamondoids; or ratios of length to width, at an assumed thickness or surface area to cross-sectional area for plate-like nanoparticles 56 such as, for example, nanographene or nanoclays) of greater than or equal to 10, specifically greater than or equal to 100, more specifically greater than or equal to 200, and still more specifically greater than or equal to 500. Similarly, the two-dimensional aspect ratio for such nanoparticles 56 may be less than or equal to 10,000, specifically less than or equal to 5,000, and still more specifically less than or equal to 1,000.

Nanoparticles 56, where included, may displace a corresponding amount of derivatized nanodiamond. Thus in an embodiment, where an additional nanoparticle 56 is used, the nanoparticle 56 may be present relative to the derivatized nanodiamond in a ratio of 0:100 to 99:1, specifically 5:95 to 95:5, more specifically 10:90 to 90:10, and still more specifically 25:75 to 75:25, based on the weights of derivatized nanodiamond to nanoparticle 56.

Fullerenes, as disclosed herein, may include any of the known cage-like hollow allotropic forms of carbon possessing a polyhedral structure. Fullerenes may include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes include, for example, $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes are carbon based, tubular fullerene structures having open or closed ends and which may be inorganic or made entirely or partially of carbon, and may include also components such as metals, metalloids or ceramics. Nanotubes, including carbon nanotubes, may be single walled nanotubes (SWNTs) or multi-walled nanotubes (MWNTs).

Nanographite is a cluster of plate-like sheets of graphite, in which a stacked structure of one or more layers of the graphite, which has a plate-like two dimensional structure of fused hexagonal rings with an extended delocalized π-electron system, layered and weakly bonded to one another through π-π stacking interaction. Graphene in general, and including nanographene, may be a single sheet or several sheets of graphite having nano-scale dimensions, such as an average particle size of (average largest dimension) of less than e.g., 500 nanometers (nm), or in other embodiments may have an average largest dimension greater than 1 μm. Nanographene may be prepared by exfoliation of nanographite or by catalytic bond-breaking of a series of carbon-carbon bonds in a carbon nanotube to form a nanographene ribbon by an "unzipping" process, followed by derivatization of the nanographene to prepare, for example, nanographene oxide.

Diamondoids may include carbon cage molecules such as those based on adamantane ($C_{10}H_{16}$), which is the smallest unit cage structure of the diamond crystal lattice, as well as variants of adamantane (e.g., molecules in which other atoms (e.g., N, O, Si, or S) are substituted for carbon atoms in the molecule) and carbon cage polyadamantane molecules including between 2 and about 20 adamantane cages per molecule (e.g., diamantane, triamantane, tetramantane, pentamantane, hexamantane, heptamantane, and the like).

Polysilsesquioxanes, also referred to as polyorganosilsesquioxanes or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures). Polysilsesquioxanes, including POSS structures, may be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane.

Nanoclays may be included in the polycrystalline diamond. Nanoclays may be hydrated or anhydrous silicate minerals with a layered structure and may include, for example, alumino-silicate clays such as kaolins including hallyosite, smectites including montmorillonite, illite, and the like. Nanoclays may be exfoliated to separate individual sheets, or may be non-exfoliated, and further, may be dehydrated or included as hydrated minerals. Other mineral fillers of similar structure may also be included such as, for example, talc, micas including muscovite, phlogopite, or phengite, or the like.

Inorganic nanoparticles 56 may also be included in the composition. Exemplary inorganic nanoparticles 56 may include a metal or metalloid carbide such as tungsten carbide, silicon carbide, boron carbide, or the like; a metal or metalloid nitride such as titanium nitride, boron nitride, silicon nitride, or the like; a metal carbonate, a metal bicarbonate, and/or a metal nanoparticle 56 such as iron, cobalt, nickel, an alloy comprising at least one of these, or the like.

It will be understood that, where a nanoparticle 56 is included, the nanoparticle 56 may be any material which, when combined with the derivatized nanodiamond 34 and microdiamond 40, does not significantly adversely affect the desired properties of the polycrystalline diamond. In an embodiment, inclusion of nanoparticles 56 further enhances desired properties of the polycrystalline diamond, such as hardness, crack/fracture resistance, substrate bonding, or other such properties.

In an embodiment, a useful nanoparticle 56 may include a single or multi-walled carbon nanotube, nanographene, a nanodiamond, a boron nitride nanoparticle, a boron carbide nanoparticle, a silicon nitride nanoparticle, a silicon carbide nanoparticle, or a combination comprising at least one of the foregoing. In an exemplary embodiment, a useful nanoparticle 56 is a boron nitride nanoparticle. In a specific embodiment, the boron nitride nanoparticle is a cubic boron nitride nanoparticle.

In other embodiments, the nanoparticle 56 may also be functionalized to form a derivatized nanoparticle 54. For example, the nanoparticle 56 may be coated with a boride, a carbide, a nitride, a metal carbonate, a metal bicarbonate, a non-catalytic metal, or a combination comprising at least one of the foregoing.

In addition to the derivatized nanodiamond and the microdiamond, a microparticle not identical to the microdiamond may be included.

As used herein, the term "microparticle" means and includes any particle having an average particle size of about 1 μm or greater. In an embodiment, the average particle size of the microparticle about 1 μm to about 250 μm, specifically about 2 μm to about 200 μm, and more specifically about 1 μm to about 150 μm.

Microparticles, where included, may displace a corresponding amount of microdiamond. Thus in an embodiment, where an additional microparticle is used, the microparticle may be present relative to the microdiamond in a ratio of 0:100 to 99:1, specifically 5:95 to 95:5, more specifically 10:90 to 90:10, and still more specifically 25:75 to 75:25, based on the weights of microdiamond to microparticle.

Exemplary microparticles may include a micrographene, a boron nitride microparticle, a silicon nitride microparticle, a silicon carbide microparticle, or a combination comprising at least one of the foregoing.

In the method, the derivatized nanodiamond 34, microdiamond 40, and metal solvent-catalyst 60, as well as any additional nano- and/or microparticles and other additives, are combined to form the polycrystalline diamond compact 100. Combining may further comprise mixing a nanoparticle not identical to the derivatized nanodiamond, and a microparticle not identical to the microdiamond, with the other components. Specifically, to affect this, the components including the derivatized nanodiamond and microdiamond are first mixed in a solvent 25 to form a suspended mixture 20. The solvent 25 may be any solvent 25 suitable for forming a suspension 10 of these components, and may include deionized water, aqueous solutions having a pH of 2 to 10, water miscible organic solvent 25s such as alcohols including methanol, ethanol, isopropanol, n- and t-butanol, 2-methoxyethanol (methyl cellosolve), 2-ethoxyethanol (ethyl cellosolve), 1-methoxy-2-propanol, dimethylsulfoxide, N,N-dimethylformamide, N,N-dimethylacetamide, N-methylpyrrolidone, gamma-butyrolactone, acetone, cyclohexanone, and the like, or a combination comprising at least one of the foregoing.

A binder may also be included in the slurry, to bind the derivatized nanodiamond and microdiamond to retain shape during further processing prior to sintering. Any suitable binder may be used provided the binder does not significantly adversely affect the desired properties of the polycrystalline diamond. Binders may comprise, for example, a metal material such as a cobalt containing material, a polymeric material such as a polyacrylate, or polyvinylbutyral, an organic material such as a cellulosic material, or the like. It will be understood that these binders are exemplary and are not limited to these.

In an embodiment, mixing comprises slurrying the derivatized nanodiamond, diamond precursor, and metal solvent-catalyst 60 to form a uniform suspension 10. As used herein, "uniform" means that the composition of the slurry, analyzed at random locations in the mixing vessel, has less than 5% variation in solids content, specifically less than 2% variation in solids content, and more specifically less than 1% variation in solids content, as determined by drying a sample of the slurry. In an embodiment, the suspension 10 has a total solids content (derivatized nanodiamond, microdiamond, and any other additives), of 0.5 to 95 wt %, specifically 1 to 90 wt %, more specifically 10 to 80 wt %, and still more specifically 10 to 50 wt %, based on the total weight of the slurry.

This suspended mixture 20 is then heated to remove the solvent 25 under elevated temperature. Thermally treating to remove solvent 25 can be carried out by subjecting the mixture 20 to a temperature of from about 400 to about 800° C., specifically about 450 to about 750° C. The thermal treating may be carried out for at least about 30 minutes, more specifically at least about 60 minutes, prior to annealing. The thermal treatment may be carried out under vacuum or at ambient pressure.

The polycrystalline diamond is formed by processing the polycrystalline diamond precursors (derivatized nanodiamonds 34, microdiamonds 40, optional nanoparticles and/or microparticles and metal solvent-catalyst 60) under conditions of heating and pressure.

As disclosed herein, "processing" means sintering the components of the polycrystalline diamond with interparticle bond formation and phase transformation of non-diamond lattice interstitial regions. Such a process is referred to herein as a high-pressure, high temperature (HPHT) process, in which interparticle bonds are formed between the derivatized nanodiamond, microdiamond, and any added nano- or microparticles. Such bonds may be covalent, dispersive including van der Waals, or other bonds. Specifically, the interparticle bonds include covalent carbon-carbon bonds, and in particular $sp^3$ carbon-carbon single bonds as found in a diamond lattice, sufficient to provide the hardness and fracture resistance disclosed herein. In an HPHT process, it is believed that component phases of the derivatized nanodiamond and/or microdiamond undergo a phase change to form a diamond lattice (tetrahedral carbon) structure, and in particular, any graphitic phase (such as, e.g., that of the carbon onion and or any amorphous carbon phase present in the nanodiamond or microdiamond) that may be present can, in principle, undergo such a phase change and structural transformation from a delocalized $sp^2$ hybridized system (a delocalized $\pi$-system) as found in the graphitic (i.e., non-diamond) phase(s), to an $sp^3$ hybridized diamond lattice.

In addition to the derivatized nanodiamond and microdiamond, nucleation particles may be included in the particulate mixture 20. Nucleation particles may comprise any type of particle on which grains of the polycrystalline diamond will nucleate and grow during an HTHP process, and may include, for example, fullerenes, diamondoids, amorphous carbon nanoparticles, graphite nanoparticles, or a combination comprising at least one of the foregoing. Ions may also be implanted into fullerene molecules, and such ion-implanted fullerenes. For example, ions of metals such as, for example, cobalt, iron, or nickel may be implanted into fullerene molecules and included as nucleation particles.

In another embodiment, when forming a polycrystalline diamond, carbon (e.g., graphite or amorphous carbon) can also be included as a carbon source additive to form an interparticle diamond phase.

In an embodiment, heating to effect sintering is carried out at a temperature of greater than or equal to about 1,000° C., and specifically greater than or equal to about 1,200° C. In an embodiment, the temperature used may be from about 1,200° C. to about 1,700° C., specifically from about 1,300° C. to about 1,650° C. The pressure used in processing may be greater than or equal to about 5.0 gigapascals (GPa), specifically greater than or equal to about 6.0 GPa, and more specifically greater than or equal to about 6.5 GPa. Processing may be carried out for 1 second to 1 hour, specifically for 1 second to 10 minutes, and still more specifically for 1 second to 2 minutes.

Thus, in an embodiment, combining further comprises sintering by subjecting the mixture 20 to a pressure greater than about 5.0 GPa and a temperature greater than about 1,000° C., for a time of about 1 second to about 1 hour.

The composition includes a metal solvent-catalyst 60. As disclosed herein, the metal solvent catalyst 60 acts to catalyze the carbon-carbon bond formation reaction. The metal solvent-catalyst 60 catalyzes the formation of diamond-to-diamond bonds between the microdiamond and the nanodiamond and between individual nanodiamond particles to form the polycrystalline diamond. In an embodiment, the metal solvent-catalyst 60 is a suitable transition metal and may comprise Ni, Fe, Co, Cr, Ru, Os, Mn, V, alloys thereof, or a combination comprising at least one of the foregoing. In a specific embodiment, the metal solvent-catalyst 60 is a Group VIIIA element (e.g., iron, cobalt, or nickel), an alloy thereof, or a combination comprising at least one of the foregoing. In an exemplary embodiment, the metal solvent-catalyst 60 comprises Co, an alloy thereof, or a combination comprising at least one of the foregoing.

In additional embodiments, the catalyst 60 material may further or alternatively comprise a carbonate material such as, for example, a carbonate of one or more of Mg, Ca, Sr, and Ba. Carbonates may also be used to catalyze the formation of polycrystalline diamond. Exemplary carbonates include magnesium carbonate, calcium carbonate, strontium carbonate, barium carbonate, or a combination comprising at least one of the foregoing. A combination comprising at least one of the foregoing metals and carbonates may be used.

The polycrystalline diamond prepared by the method may include the metal solvent-catalyst 60 in an amount of about 0.1% to about 30% by weight.

A polycrystalline diamond prepared by the method may be a superabrasive for use in an article such as a cutting tool, such as a drill bit for an earth-boring apparatus. As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits and other drilling bits and tools known in the art.

In an embodiment, a method of making a superabrasive article (e.g., a drill bit), comprising forming a superabrasive polycrystalline diamond compact in an HPHT process by combining a nanodiamond 34 derivatized to include functional groups, a microdiamond 40, and a metal solvent-catalyst 60; combining the polycrystalline diamond with a support, wherein the microdiamond has an average particle size greater than that of the derivatized nanodiamond, and removing the metal solvent-catalyst 60.

The polycrystalline diamond surface may be affixed to a substrate to form a polycrystalline diamond compact (PDC) which in turn is attached to a support such as a drill head. The substrate may be a ceramic material. Polycrystalline diamond integrated onto such a substrate may also be referred to as a diamond table. In an embodiment, polycrystalline diamond may be formed on a supporting substrate of cemented tungsten carbide or another suitable substrate material in a conventional HTHP process as described, for example, in U.S. Pat. No. 3,745,623, or may be formed as a free-standing polycrystalline diamond compact without a supporting substrate, formed in a similar conventional HTHP process as described, for example, in U.S. Pat. No. 5,127,923, the disclosure of each of which patents is incorporated herein by reference in its entirety. In an embodiment, the metal solvent-catalyst 60 may be supplied from the supporting substrate during an HTHP process used to form the polycrystalline diamond. For example, the substrate may include a cobalt-cemented tungsten carbide material. The cobalt of the cobalt-cemented tungsten carbide may serve as the metal solvent-catalyst 60 during the HTHP process.

Figure 15:
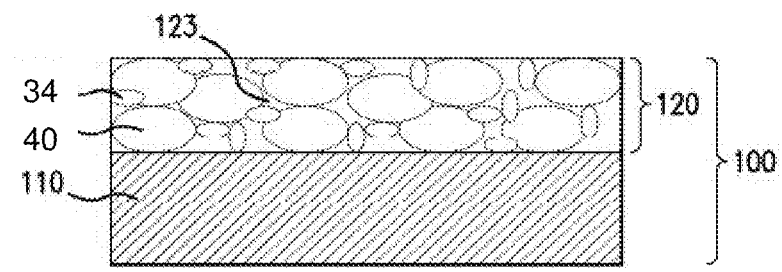
FIG. 15 is a cross-sectional view of an exemplary polycrystalline diamond compact (PDC)

FIG. 15 illustrates an exemplary a polycrystalline diamond 130 incorporated into a polycrystalline diamond compact 100. In FIG. 14, a support 110, has a polycrystalline diamond 120 disposed on a surface of the support 110. The substrate support 110 may be formed of, for example, tungsten carbide or other suitable substrate material. Also, in an exemplary embodiment, the metal solvent-catalyst 60 is cobalt or a cobalt alloy, where, during the sintering process, the metal solvent-catalyst 60 intercalates into the forming interstitial spaces 123 by wetting and capillary action, which exist throughout the polycrystalline diamond 120 between the previously derivatized nanodiamonds 34 and the microdiamonds 40. It will be understood that during formation of the polycrystalline diamond 120 and/or during sintering of polycrystalline diamond 120, the functional groups present on the previously derivatized nanodiamonds 34 undergo thermal degradation under the high temperatures exceeding 900° C. used in the HPHT process, and sufficient to soften and/or melt the metal solvent-catalyst 60 (e.g., where cobalt, which may be used as the metal solvent-catalyst 60 is softened at a temperature of about 1,450° C.), and the previously derivatized nanodiamonds 34 and the microdiamonds 40 form interparticle bonds between the previously derivatized nanodiamonds 30, microdiamonds 40, nano- and microdiamonds 40, and any other nano- and/or microparticles or diamond-phases that may form during sintering. In a further embodiment, the metal solvent-catalyst 60 may be wholly or partially removed from the polycrystalline diamond by, for example, a leaching process, to provide a PDC with reduced amounts of interstitial metal (i.e., from the metal solvent-catalyst 60).

In additional embodiments, amorphous carbon layers may be formed on particles of Ni, Pt, Cu, Fe, Co, Mo, Mg, Ag, Ti, Nb, Y, and Si to facilitate diamond nucleation and formation of the carbon-carbon interparticle bond. Alternatively, the amorphous carbon layers may be included on a material that does not readily form a carbide compound such as, for example, Cu or Au.

A method of forming a polycrystalline diamond comprises processing a suspension 10 under heat and pressure and in the presence of a metal solvent-catalyst 60, the suspension 10 comprising as components: a nanodiamond having an average particle size of 1 to 500 nm and derivatized to include functional groups comprising alkyl, alkenyl, alkynyl, carboxyl, hydroxyl, amino, amido, epoxy, keto, alkoxy, ether, ester, lactones, metallic groups, organometallic groups, polymeric groups, ionic groups, or a combination comprising at least one of the foregoing, a microdiamond having a size greater than that of the derivatized nanodiamond, and a solvent 25, wherein the components are more homogeneously distributed throughout the suspension 10 than when a non-derivatized nanodiamond is included in place of the derivatized nanodiamond. The derivatized nanodiamonds and the microdiamonds, and any added nanoparticles or microparticles, may remain homogeneously distributed after processing to forming the polycrystalline diamond. Alternatively, the derivatized nanodiamonds and the microdiamonds, and any added nanoparticles or microparticles, may adopt a gradient structure where the particle sizes of the constituent derivatized nanodiamonds and microdiamonds, and any other particles therein, stratify to form zones in which the microdiamonds distribute closer to the catalyst (table), and the nanodiamonds distribute to the surface, with intermediate, e.g., sub-micron sized, nanoparticles distributing to the middle of the polycrystalline diamond. Such a gradient structure for a polycrystalline diamond is described in U.S. Provisional Patent Application No. 61/373,617, filed Aug. 13, 2010, and entitled "Cutting Elements Including Nanoparticles in At Least One Portion Thereof, Earth-Boring Tools Including Such Cutting Elements, and Related Methods", the disclosure of which provisional patent application is incorporated herein in its entirety by this reference.

The metal solvent-catalyst 60 catalyzes the formation of the interparticle bonds between the functionalized nanodiamonds 34 and microdiamonds 40 during the HTHP process. During the HTHP process, the metal solvent-catalyst 60 may intrude or intercalate into the interstitial spaces in the polycrystalline diamond as it is forming the interstitial lattice and carbon-carbon bonds, wicking upwards from the ceramic surface into the porous interstitial structure of the polycrystalline diamond as it forms. In this way, the resulting metallic intrusions may act to interconnect and adhere the underlying ceramic substrate to the polycrystalline diamond and bond the polycrystalline diamond to the ceramic substrate, thereby forming a thermally stable diamond table.

After the HTHP process, the metal solvent-catalyst 60 (e.g., cobalt) remains in the interstitial spaces, which may be open or closed cell pores, between the inter-bonded particles. Some of the metal solvent-catalyst 60 may become entrapped in closed-cell pores within the body of the polycrystalline diamond or PDC and some of the metal solvent-catalyst 60 remains in the more open-cell pores of the polycrystalline diamond.

Such metal solvent-catalyst 60 may be removed from the polycrystalline diamond after the HTHP process. A leaching process may be used to remove at least a portion of, or substantially all of, the metal solvent-catalyst 60 from the interstitial spaces between the inter-bonded grains within the polycrystalline diamond. As used herein, "substantially all" means having a total amount of metal solvent-catalyst 60 in the leached regions of the polycrystalline diamond of less than about 5 wt %, specifically less than or equal to 4 wt %, still more specifically less than or equal to 3 wt %, based on the weight of metal per unit volume of leached region of the polycrystalline diamond. In another embodiment, the polycrystalline diamond contains at least about 1.5 wt % weight of metal per unit volume of the polycrystalline diamond.

In one embodiment, the polycrystalline diamond may be leached using a leaching agent and process such as those described more fully in, for example, U.S. Pat. No. 5,127,923 and U.S. Pat. No. 4,224,380, the disclosure of each of which patent is incorporated herein by reference in its entirety.

For example, aqua regia, which is a mixture 20 of concentrated nitric acid ($HNO_3$) and concentrated hydrochloric acid (HCl), in any effective proportion such as, for example, in a 1:3 (v/v) ratio, may be used to at least remove substantially all catalyst material from the interstitial spaces between the inter-bonded grains in the polycrystalline diamond. Alternatively, boiling hydrochloric acid (HCl) and/or boiling hydrofluoric acid (HF) may be used as leaching agents. In an exemplary embodiment, a useful leaching agent is hydrochloric acid (HCl) heated to a temperature of greater than 110° C., which may be provided in contact with the polycrystalline diamond for about 20 min to about 1,000 hours or even greater, depending upon the size of the body including the polycrystalline diamond, and the extent of leaching desired in the polycrystalline diamond.

Thus, in an embodiment, leaching comprises immersing the polycrystalline diamond compact in hydrochloric acid, hydrofluoric acid, nitric acid, or a combination comprising at least one of the foregoing, at a temperature at or greater than 20° C.

After leaching the metal solvent-catalyst 60 from the polycrystalline diamond, the interstitial spaces between the inter-bonded grains within the polycrystalline diamond may be free of substantially all catalyst 60 material used to catalyze formation of interparticle bonds between the grains in the polycrystalline diamond.

The overall microstructure in the polycrystalline diamond that may be achieved in accordance with the method disclosed herein may result in polycrystalline diamonds and PDCs that exhibit improved durability and thermal stability.

The various embodiments referred to herein are exemplary embodiments, regardless of whether specifically so designated or not.

While one or more embodiments have been shown and described, modifications and substitutions may be made thereto without departing from the spirit and scope of the invention. Accordingly, it is to be understood that the present invention has been described by way of illustrations and not limitation. The above embodiments are further illustrated in the following examples.

EXAMPLES

A commercially available nanodiamond cluster (75 mg, having an average particle size of about 75 nm, available from NanoDiamond Products) is suspended in 100 ml of liquid ammonia in a dry ice/acetone bath. Lithium metal (175 mg) is added to the liquid ammonia solution, whereupon the solution attains a blue color indicating dissolution of the lithium metal. When the addition of lithium is complete, the solution is stirred for 30 minutes, and 1-iodododecane (I—$CH_2$—$(CH_2)_{10}$—$CH_3$) (6.5 ml) is then added slowly to the ammonia slurry of metalized nanodiamond. The resulting solution is allowed to react for four hours at room temperature, after which ammonia is slowly removed to isolate the solid product. The resulting solid material is isolated to yield 1-dodecyl derivatized nanodiamond.

Figure 16:
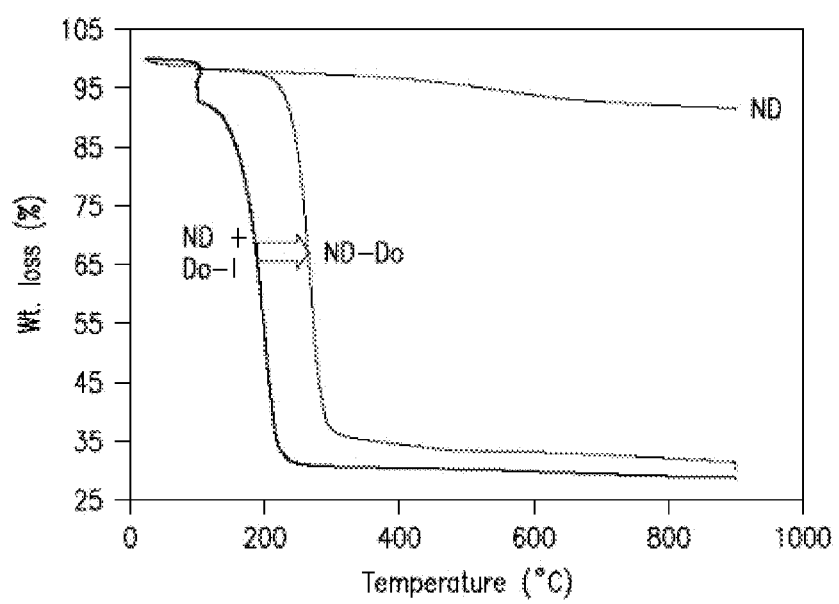
FIG. 16 is a comparative thermogravimetric analysis (TGA) plot showing TGA performance of nanodiamond (ND), nanodiamond in admixture with 1-iodododecane (ND+Do-I), and n-dodecyl modified nanodiamond (Do-ND)

Thermogravimetric analysis (TGA). The functionalized nanodiamond is evaluated by TGA to confirm the presence of covalently bound n-dodecyl groups. FIG. 16 shows a comparative thermogravimetric analysis (TGA) plot of weight loss versus temperature, showing TGA performance of nanodiamond (ND), nanodiamond in a mechanically-mixed admixture with 1-iodododecane (ND+Do-I), and n-dodecyl-modified nanodiamond (Do-ND). In FIG. 16, it can be seen that the nanodiamond control (ND) does not exhibit significant change in weight with increasing temperature, where both the nanodiamond-1-iodododecane admixture and the dodecyl-modified nanodiamond each show a weight loss with increasing temperature. The TGA plot, obtained at a heating rate of 10° C./minute, shows a clear increase in degradation temperature from the admixture of ND+Do-I, with an onset temperature of about 100° C. and a maximum rate of change at about 190° C., to ND-Do, with an onset temperature of about 200° C. and a maximum rate of change at about 260° C. Thus, based on the comparison, it can be seen that the dodecyl groups are bound (e.g., covalently) to the nanodiamond after derivatization.

Figure 17A:
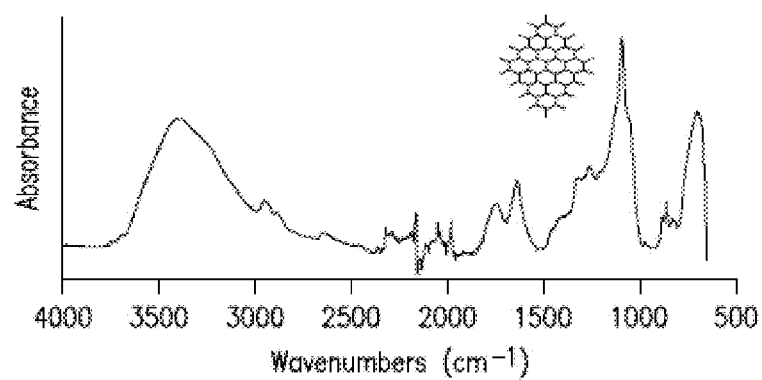
FIGS. 17A and 17B show Fourier Transform Infrared Spectrophotometry (FT-IR) spectra for the unmodified nanodiamond (FIG. 17A) and for the n-dodecyl modified nanodiamond (FIG. 17B)
Figure 17B:
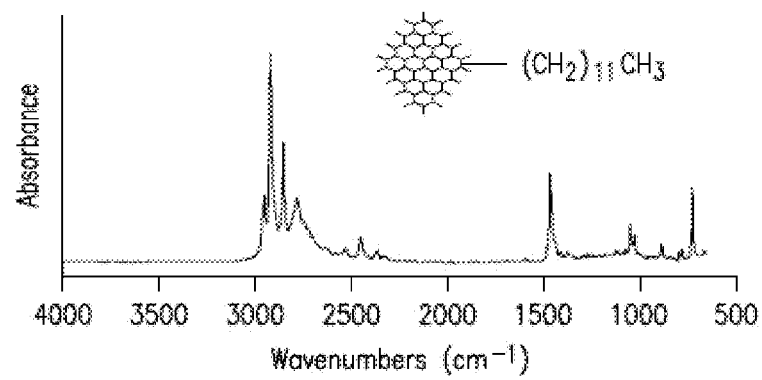

Infrared analysis (IR). A comparison of the infrared spectra using a Fourier Transform Infrared Spectrophotometer (FT-IR) is shown in FIGS. 17A and 17B for the unmodified nanodiamond (FIG. 17A) and for the n-dodecyl modified nanodiamond (FIG. 17B). In FIG. 17A, the nanodiamond prior to derivatization has a complex spectrum including associated water O—H stretching at about 3300 cm$^{-1}$ and C—H olefinic stretching at >3000 cm$^{-1}$ as well as C—H alkyl stretching at <3000 cm$^{-1}$, carboxylic acid and anhydride carbonyl stretching at about 1700-1800 cm$^{-1}$, and C=C stretching at about 1600-1670 cm$^{-1}$, whereas after derivatization, the FT-IR spectrum shown for the dodecyl-modified nanodiamond in FIG. 17B shows prominent and sharp new peaks at 2800-2980 cm$^{-1}$ and 725-1470 cm$^{-1}$, corresponding to alkyl C—H stretch and deformation modes, respectively. Thus it can be clearly seen in the FT-IR spectra that the nanodiamond has been derivatized to include dodecyl groups.

Figure 18A:
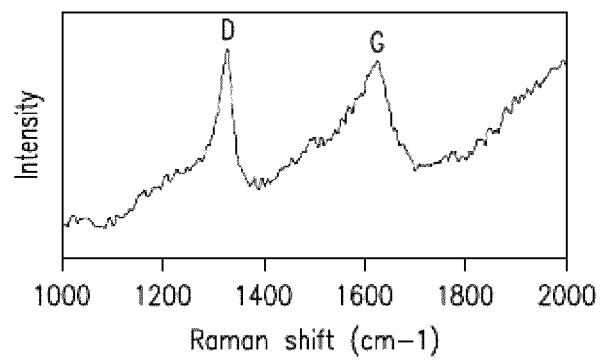
FIGS. 18A to 18C show the Raman IR spectra of as received nanodiamonds (FIG. 18A), nanodiamonds after being derivatized with dodecyl groups (FIG. 18B) and of post-TGA nanodiamonds (FIG. 18C)
Figure 18B:
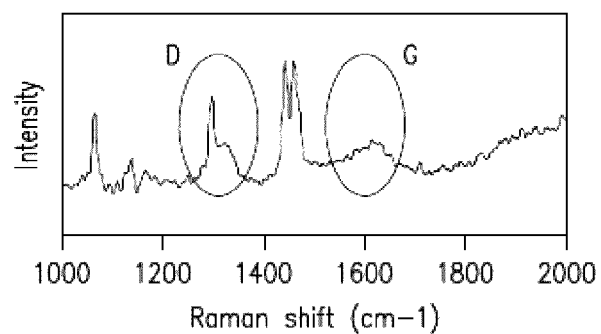
Figure 18C:
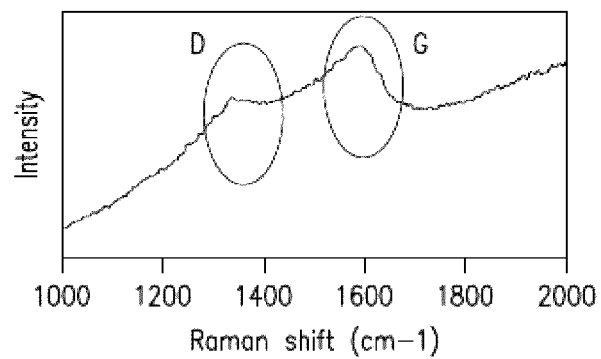
Figure 19:
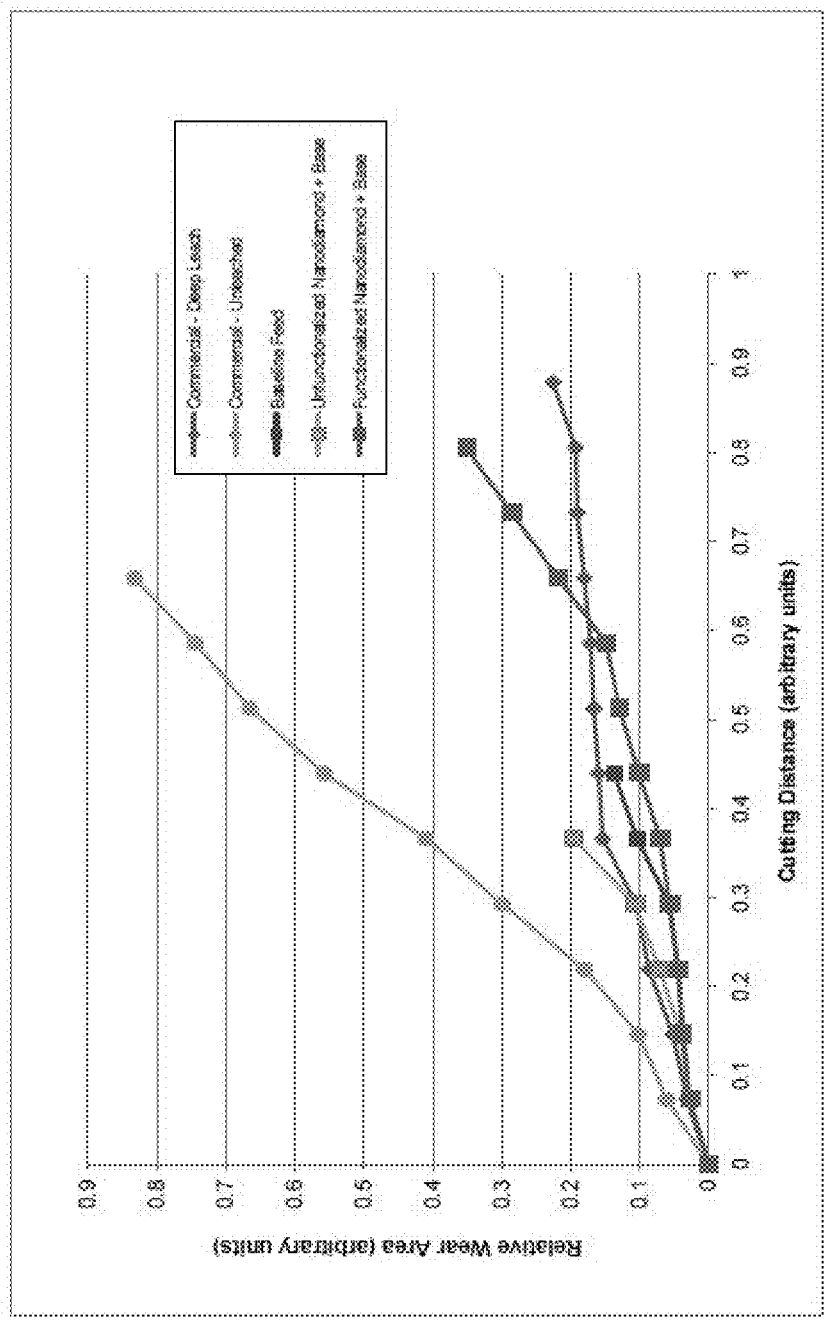
FIG. 19 is a comparative plot of relative wear area versus cutting distance for exemplary polycrystalline diamond prepared with a derivatized nanodiamond and a microdiamond, and comparative polycrystalline diamonds prepared with a non-derivatized nanodiamond and microdiamond, microdiamond only, a commercial polycrystalline diamond, and a "leached" commercial polycrystalline diamond.

Reaction validation study by Raman Spectroscopy. FIGS. 18A to 18C show the Raman IR spectra of as received nanodiamonds (FIG. 18A), nanodiamonds after being derivatized with dodecyl groups (FIG. 18B) and of post-TGA nanodiamonds (FIG. 18C). FIG. 18A shows peaks at 1325 and 1623 cm$^{-1}$ corresponding to the D-band (disorder band) and G-band (graphitic band) of the nanodiamond, respectively. Upon derivatization, and as expected, the intensity of the G-band (at 1294 cm$^{-1}$ in FIG. 18B) decreases significantly with respect to the intensity of the D-band (at 1610 cm$^{-1}$ in FIG. 18B). The additional bands between 1200-1600 cm$^{-1}$ correspond to the presence of the dodecyl group after derivatization of the nanodiamond (see, e.g., Raman Spectrum of 1-Bromo-Dodecane, *J. Chem. Phys*, 1968, vol. 8, p. 867). However, upon heating at high temperature, the derivatized nanodiamond loses the functional groups resulting in increase of the G-band intensity with respect to the D-band intensity (FIG. 18C). Thus inclusion of the functional groups is useful for improving solvent dispersibility but does not necessarily form a part of the polycrystalline diamond component after sintering.

Formation of a Polycrystalline Diamond Compact (PDC) using derivatized nanodiamond.

A slurry of nanodiamonds having an average cluster size of 75 nm were derivatized by the aforementioned process and combined with a slurry of microdiamonds having an average particle size of 4 micrometers, which may also include microdiamond particles derivatized to form a slurry by the aforementioned process. The microdiamonds 40 were stabilized in a solution by inclusion of a solvent 25, dispersant, and binder. The two separate solutions were mixed to form a substantially homogeneous suspension 10 of derivatized nanodiamond and microdiamond and subsequently dried to remove excess solvent 25. A derivatized nanodiamond PDC is formed from the dried substantially homogeneous mixture 20 of microdiamond particles in which the microdiamonds 40 constitute about 90 to 95 weight percent of the mixture 20 (based on the combined weight of nanodiamond and microdiamond), with the remainder of particles being the derivatized nanodiamond 34. The solid mixture 20 of microdiamond 40 and derivatized nanodiamond 34 particles was placed onto a cobalt-cemented tungsten carbide substrate for forming the PDC. The mixture 20 and substrate were then placed in a niobium can which was in turn placed in a standard high-pressure cell suitable for HPHT processes. The can with diamond particle mixture 20 is sintered at a temperature of about 1,400 to about 1,550° C. and at a pressure of about 4.2 to 6 GPa for about 90 seconds to form the derivatized nanoparticle 34 enhanced PDC.

A comparative PDC was formed using only the microdiamond slurry as a base composition (where the microdiamonds constituted 100 wt % of the solid mixture), and another comparative PDC was formed from a combination of a slurry of the nanodiamonds (underivatized) and the microdiamond slurry. Both comparative PDCs were prepared using identical processes.

FIG. 6 shows a comparative plot of relative wear area (arbitrary units) versus cutting distance (arbitrary units) for an unleached commercial PDC ("Commercial-Unleached"), a commercial PDC deep leached to remove catalyst ("Commercial-Deep Leach"), the baseline PDC prepared with only the microdiamonds ("Baseline Feed"), the PDC prepared using unfunctionalized nanodiamonds plus microdiamonds ("Unfunctionalized Nanodiamond+Base"), and the PDC prepared using the functionalized nanodiamonds plus microdiamonds ("Functionalized Nanodiamond+Base"). As seen in the plot, the unfunctionalized nanodiamond PDC deviates sharply from the functionalized nanodiamond PDC, reaching a relative wear of about 0.2 in a cutting distance of about 0.37, where the functionalized nanodiamond PDC does not incur the same degree of wear until reaching a cutting distance of about 0.64. The baseline PDC with only microdiamonds shows an intermediate wear resistance between that of the unfunctionalized nanodiamond PDC and the functionalized nanodiamond PDC.

The unleached commercial PDC shows significant wear per cutting distance, reaching a relative wear of about 0.2 by a cutting distance of about 0.23 and showing almost linear wear up to 0.84 relative units out to a cutting distance of about 0.66. While the deep leached commercial PDC shows the least overall wear of about 0.23 out to a cutting distance of about 0.88, the functionalized nanodiamond PDC showed the lowest initial wear with the lowest slope, at a total wear of about 0.7 to a cutting distance of about 0.36 (compare to the deep leached commercial PDC which showed more than twice the wear at 0.16 in the same cutting distance). Further, the functionalized nanodiamond PDC showed less wear than the deep leached commercial PDC out to a cutting distance of about 0.62.

From these results, it can be seen that the initial and abrasion resistance of a PDC prepared with a derivatized nanodiamond has significantly improved wear resistance performance over that of an exemplary commercial PDC, a PDC prepared using microdiamonds alone, or a PDC prepared using underivatized nanodiamonds and microdiamonds. Further, the initial wear resistance of the PDC prepared using derivatized nanodiamonds and microdiamonds, and which was not deep leached, is still superior to that of a deep-leached commercial PDC.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant (s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A substantially homogeneous particle mixture, comprising
a plurality of derivatized nanodiamond particles comprising a plurality of first functional groups,
a plurality of microdiamond particles; and
a plurality of derivatized metal solvent-catalyst particles, wherein the derivatized nanodiamond particles, microdiamond particles, and derivatized metal solvent-catalyst particles comprise a substantially homogeneous particle mixture.

2. The particle mixture of claim 1, wherein the plurality of microdiamond particles comprise a plurality of derivatized microdiamond particles comprising a plurality of second functional groups, the plurality of derivatized metal solvent-catalyst particles comprise a plurality of third functional groups, and wherein the derivatized nanodiamond particles, derivatized microdiamond particles, and derivatized metal solvent-catalyst particles comprise the substantially homogeneous particle mixture.

3. The particle mixture of claim 1, wherein the first functional group comprises at least one of an alkyl, alkenyl, alkynyl, carboxyl, hydroxyl, amino, amido, epoxy, keto, alkoxy, ether, ester or lactone functional group, or a combination thereof; a metal; an organometallic material; an oligomer or a polymer; or an ionic group; or a combination thereof.

4. The particle mixture of claim 2, wherein the first functional group, second functional group, or third functional group, or any combination of them, comprises at least one of an alkyl, alkenyl, alkynyl, carboxyl, hydroxyl, amino, amido, epoxy, keto, alkoxy, ether, ester or lactone functional group, or a combination thereof; a metal; an organometallic material; an oligomer or a polymer; or an ionic group; or a combination thereof.

5. The particle mixture of claim 2, wherein the first functional group and the second functional group comprise the same functional groups.

6. The particle mixture of claim 1, further comprising a plurality of fourth particles comprising nanoparticles not identical to the derivatized nanodiamond particles, or a plurality of microparticles not identical to the microdiamond particles, or a combination thereof, and the derivatized nanodiamond particles, derivatized microdiamond particles, derivatized metal solvent-catalyst particles, and fourth particles comprise the substantially homogeneous particle mixture.

7. The particle mixture of claim 2, further comprising a plurality of derivatized fourth particles comprising nanoparticles not identical to the derivatized nanodiamond particles, or a plurality of microparticles not identical to the microdiamond particles, or a combination thereof, and the derivatized nanodiamond particles, derivatized microdiamond particles, derivatized metal solvent-catalyst particles, and derivatized fourth particles comprise the substantially homogeneous particle mixture.

8. The particle mixture of claim 7, wherein the first functional group, second functional group, third functional group, or fourth functional group, or any combination thereof, comprises at least one of an alkyl, alkenyl, alkynyl, carboxyl, hydroxyl, amino, amido, epoxy, keto, alkoxy, ether, ester or lactone functional group, or a combination thereof; a metal; an organometallic material; an oligomer or a polymer; or an ionic group; or a combination thereof.

9. The particle mixture of claim 8, wherein the first functional group, second functional group, and third functional group, and fourth functional group comprise the same functional group.

10. The particle mixture of claim 8, wherein the first functional group, second functional group, third functional group, and fourth functional group each comprise a different functional group.

11. The particle mixture of claim 6, wherein the nanoparticles comprise a fullerene, nanographite, nanographene, graphene oxide, nanotube, adamantane, diamondoid, nanodiamond, polysilsesquioxane, nanoclay, metal, metallic carbide, metallic nitride, metallic carbonate or metallic bicarbonate, or a combination thereof.

12. The particle mixture of claim 11, wherein the nanoparticles comprise a single-walled carbon nanotube, multi-walled carbon nanotube, nanographene, nanodiamond, boron nitride, boron carbide, silicon carbide, or a combination thereof.

13. The particle mixture of claim 11, wherein the microparticles comprise graphite, carbon fiber, boron nitride, diamond, silicon carbide, or tungsten carbide, or a combination thereof.

14. The particle mixture of claim 1, wherein the metal solvent-catalyst particles comprise about 0.1% to about 30% by weight of the particle mixture.

15. The particle mixture of claim 1, wherein the metal solvent-catalyst particles comprise Ni, Fe, Co, Cr, Ru, Os, Mn, V, alloys thereof, or a combination comprising at least one of the foregoing; magnesium carbonate, calcium carbonate, strontium carbonate, barium carbonate, or a combination comprising at least one of the foregoing; or a combination comprising at least one of the foregoing metals and carbonates.

16. The particle mixture of claim 6, wherein the metal solvent-catalyst particles comprise Ni, Fe, Co, Cr, Ru, Os, Mn, V, alloys thereof, or a combination comprising at least one of the foregoing; magnesium carbonate, calcium carbonate, strontium carbonate, barium carbonate, or a combination comprising at least one of the foregoing; or a combination comprising at least one of the foregoing metals and carbonates.

17. The particle mixture of claim 1, wherein the metal solvent-catalyst particles comprise Ni, Pt, Cu, Fe, Co, Mo, Mg, Ag, Ti, Nb, Y, or Si particles having a layer of amorphous carbon disposed thereon.

18. The particle mixture of claim 6, wherein the metal solvent-catalyst particles comprise Ni, Pt, Cu, Fe, Co, Mo, Mg, Ag, Ti, Nb, Y, or Si particles having a layer of amorphous carbon disposed thereon.

19. The particle mixture of claim 6, wherein the metal solvent-catalyst particles comprise about 0.1% to about 30% by weight of the particle mixture.

20. The particle mixture of claim 1, wherein the particle mixture comprises a polycrystalline diamond compact precursor particle mixture.

21. The particle mixture of claim 1, wherein the plurality of derivatized nanodiamond particles comprises a predetermined amount of derivatized nanodiamond particles.

22. The particle mixture of claim 21, wherein the predetermined amount of derivatized nanodiamond particles comprises 0.01 to 70 wt % of the particle mixture.

23. The particle mixture of claim 2, wherein the derivatized microdiamond particles are derivatized without direct halogenation.

* * * * *